United States Patent [19]

McAlister

[11] 4,279,244
[45] Jul. 21, 1981

[54] RADIANT ENERGY HEAT EXCHANGER SYSTEM

[76] Inventor: Roy E. McAlister, 5285 Red Rock North, Phoenix, Ariz. 85018

[21] Appl. No.: 98,814

[22] Filed: Nov. 30, 1979

Related U.S. Application Data

[63] Continuation of Ser. No. 860,779, Dec. 15, 1977, abandoned, which is a continuation-in-part of Ser. No. 696,366, Jun. 15, 1976, abandoned.

[51] Int. Cl.³ ............................................... F24J 3/02
[52] U.S. Cl. ................................... 126/450; 126/440; 126/426; 126/428
[58] Field of Search ............. 126/417, 450, 426, 440, 126/438, 428, 430, 437, 432; 165/485

[56] References Cited

U.S. PATENT DOCUMENTS

| | | | |
|---|---|---|---|
| 679,451 | 7/1901 | Baker | 126/448 |
| 921,976 | 5/1909 | Glass | 126/438 |
| 1,093,925 | 4/1914 | Foresman | 126/432 |
| 1,119,063 | 12/1914 | Burmap | 126/435 |
| 1,888,620 | 11/1932 | Clark | 126/435 |
| 2,405,118 | 8/1946 | Delano | 126/426 |
| 2,553,302 | 5/1951 | Cornwell | 126/422 |
| 2,705,948 | 4/1955 | Rostock | 126/434 |
| 2,933,885 | 4/1960 | Benedek | 126/428 |
| 2,998,006 | 8/1961 | Johnston | 126/428 |
| 3,076,450 | 2/1963 | Gough | 126/444 |
| 3,077,190 | 2/1963 | Allen | 126/415 |
| 3,145,707 | 8/1964 | Thomason | 126/432 |
| 3,205,937 | 9/1965 | Shyffer | 126/439 |
| 3,215,134 | 11/1965 | Thomason | 126/444 |
| 3,236,294 | 2/1966 | Thomason | 126/427 |
| 3,399,664 | 9/1968 | Suhay | 126/450 |
| 3,453,666 | 7/1969 | Hedges | 126/415 |
| 3,467,840 | 9/1969 | Weiner | 126/439 |
| 3,859,980 | 1/1975 | Crawford | 126/426 |
| 3,915,148 | 10/1975 | Fletcher | 126/422 |
| 3,918,430 | 11/1975 | Stout | 126/448 |
| 3,958,553 | 5/1976 | Brantley | 126/441 |
| 3,980,071 | 9/1976 | Barber | 126/447 |
| 4,003,365 | 1/1977 | Wiegand | 126/437 |
| 4,008,708 | 2/1977 | Hagarty | 126/445 |
| 4,026,268 | 5/1977 | Bartos | 126/445 |
| 4,051,835 | 10/1977 | Hinson-Rider | 126/440 |
| 4,085,731 | 4/1978 | Weir | 126/435 |
| 4,086,086 | 4/1978 | Harney | |
| 4,103,673 | 8/1978 | Woodworth | 126/439 |
| 4,114,597 | 9/1978 | Erb | 126/448 |

FOREIGN PATENT DOCUMENTS

2532174  2/1977  Fed. Rep. of Germany .
2536687  3/1977  Fed. Rep. of Germany .

Primary Examiner—James C. Yeung
Assistant Examiner—Larry Jones
Attorney, Agent, or Firm—Cushman, Darby & Cushman

[57] ABSTRACT

A radiant energy heat exchanger comprising a panel structure including a base having a multiplicity of transversely spaced barrier walls extending longitudinally between the end portions of the panel structure, an inner sheet form wall section sealingly connected with each pair of adjacent barrier walls providing a plurality of inner fluid containing channel spaces extending longitudinally between the end portions of the panel structure, a concavo-convex outer sheet form wall section sealingly connected with each pair of adjacent barrier walls, and an intermediate sheet form wall section between the associated inner and outer wall sections defining a multiplicity of outer and intermediate fluid containing spaces in outwardly disposed relation with respect to the multiplicity of inner fluid containing channel spaces.

66 Claims, 24 Drawing Figures

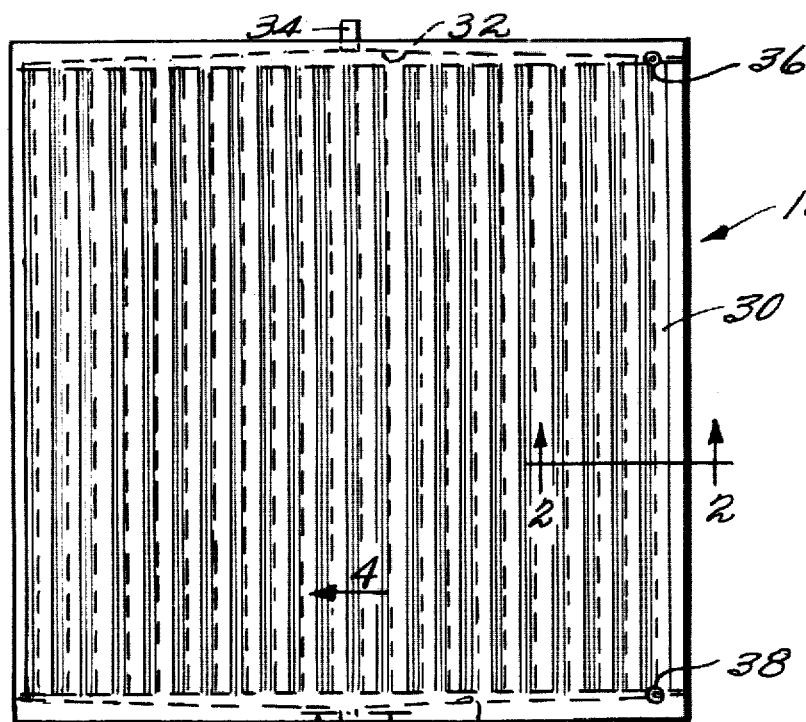
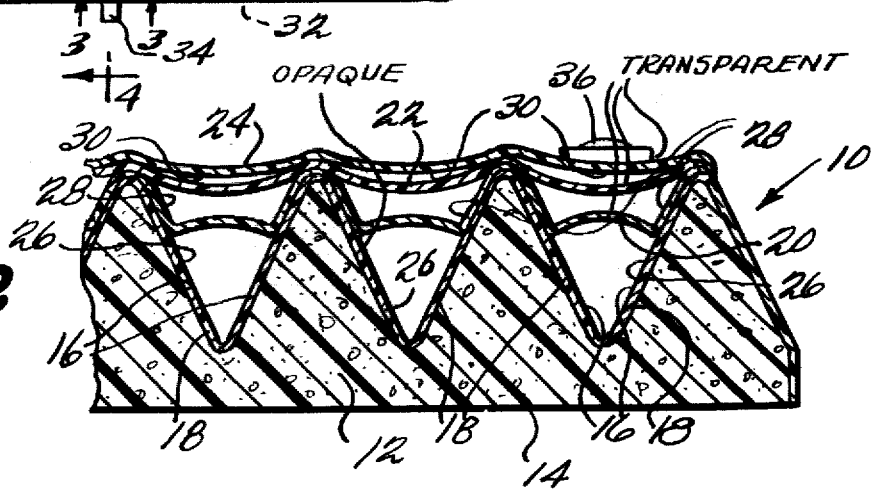
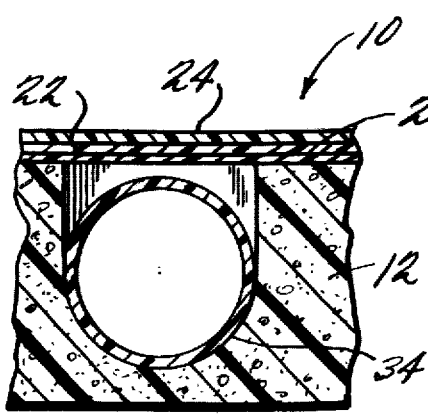
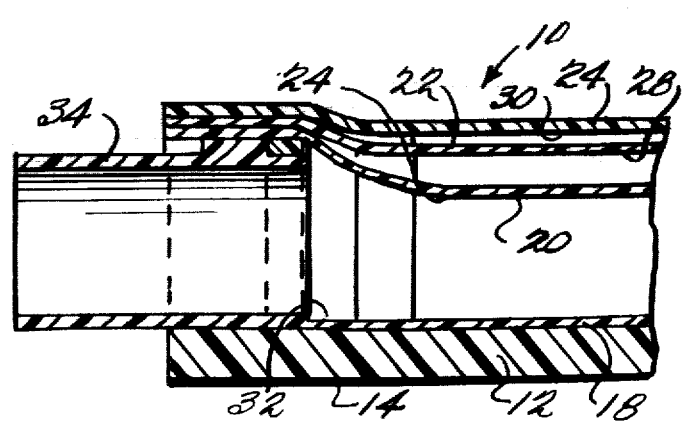

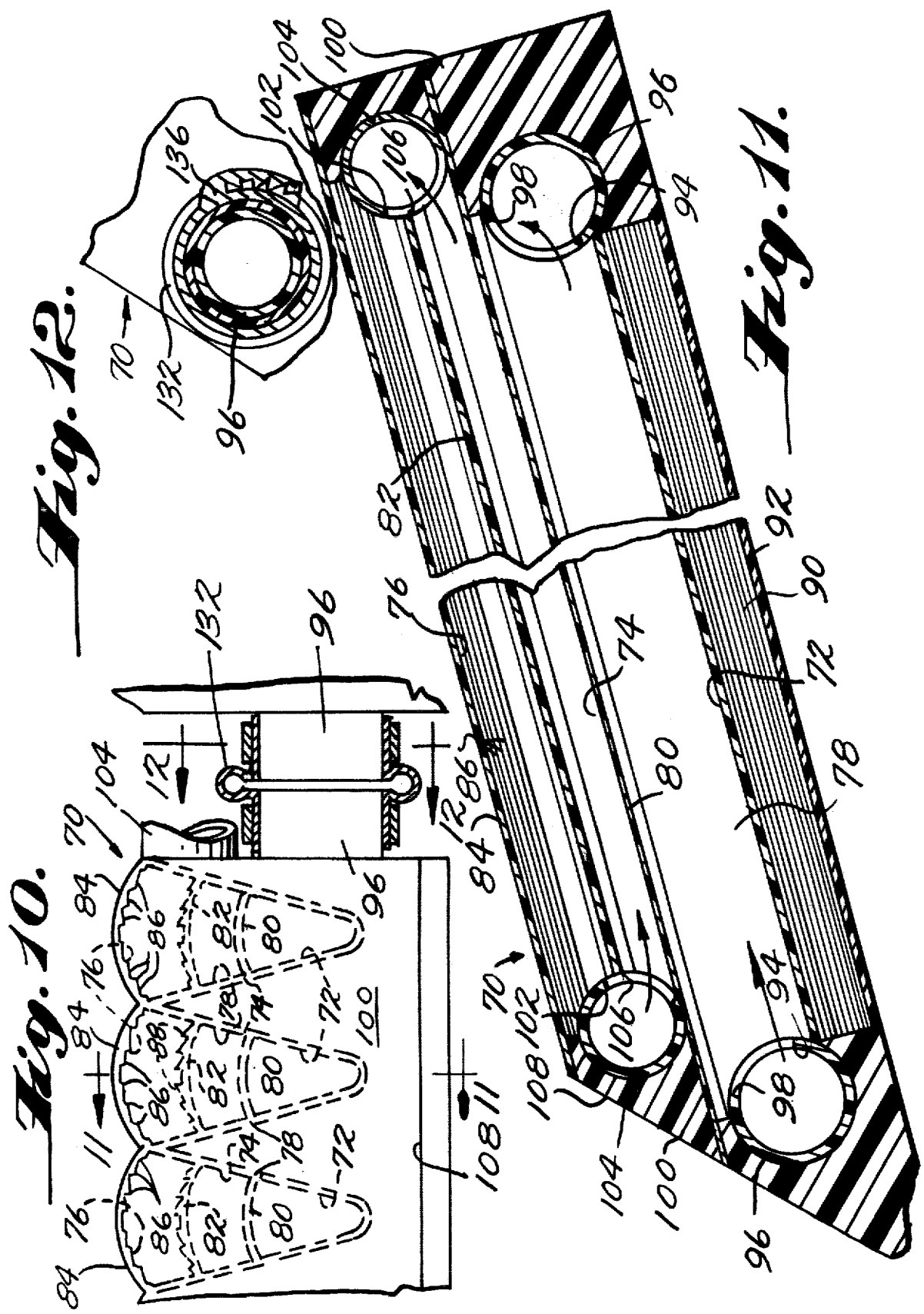

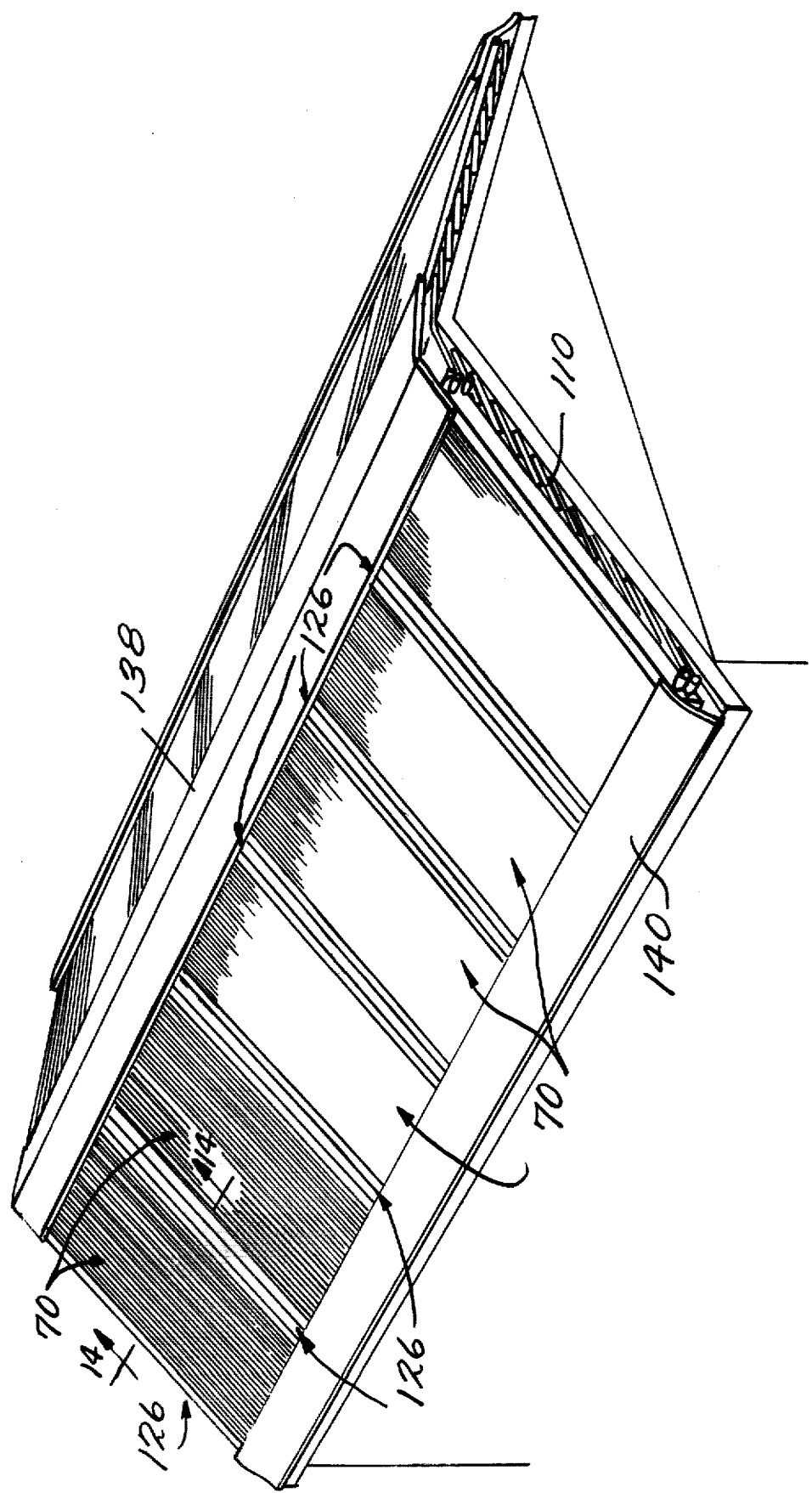

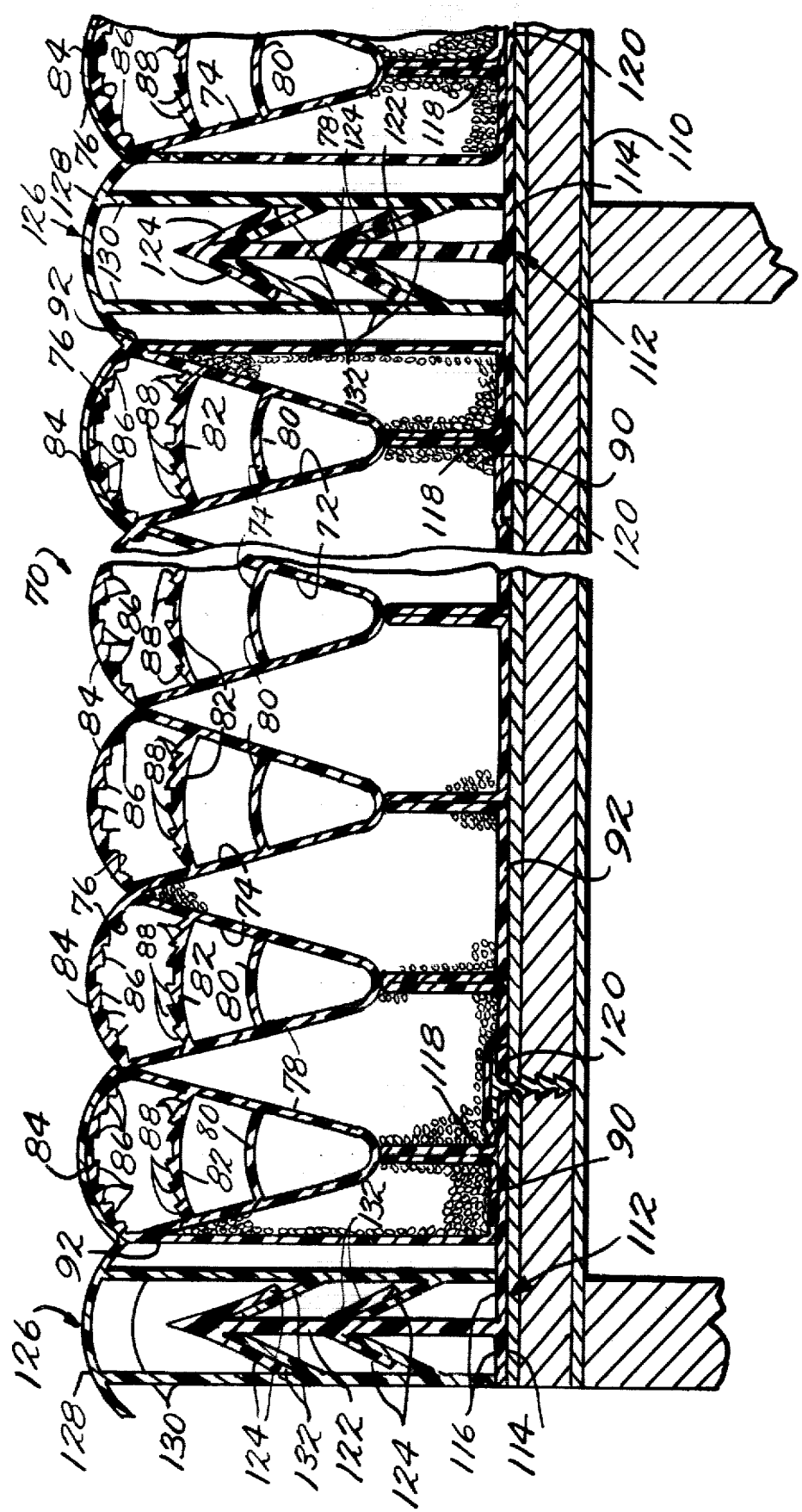

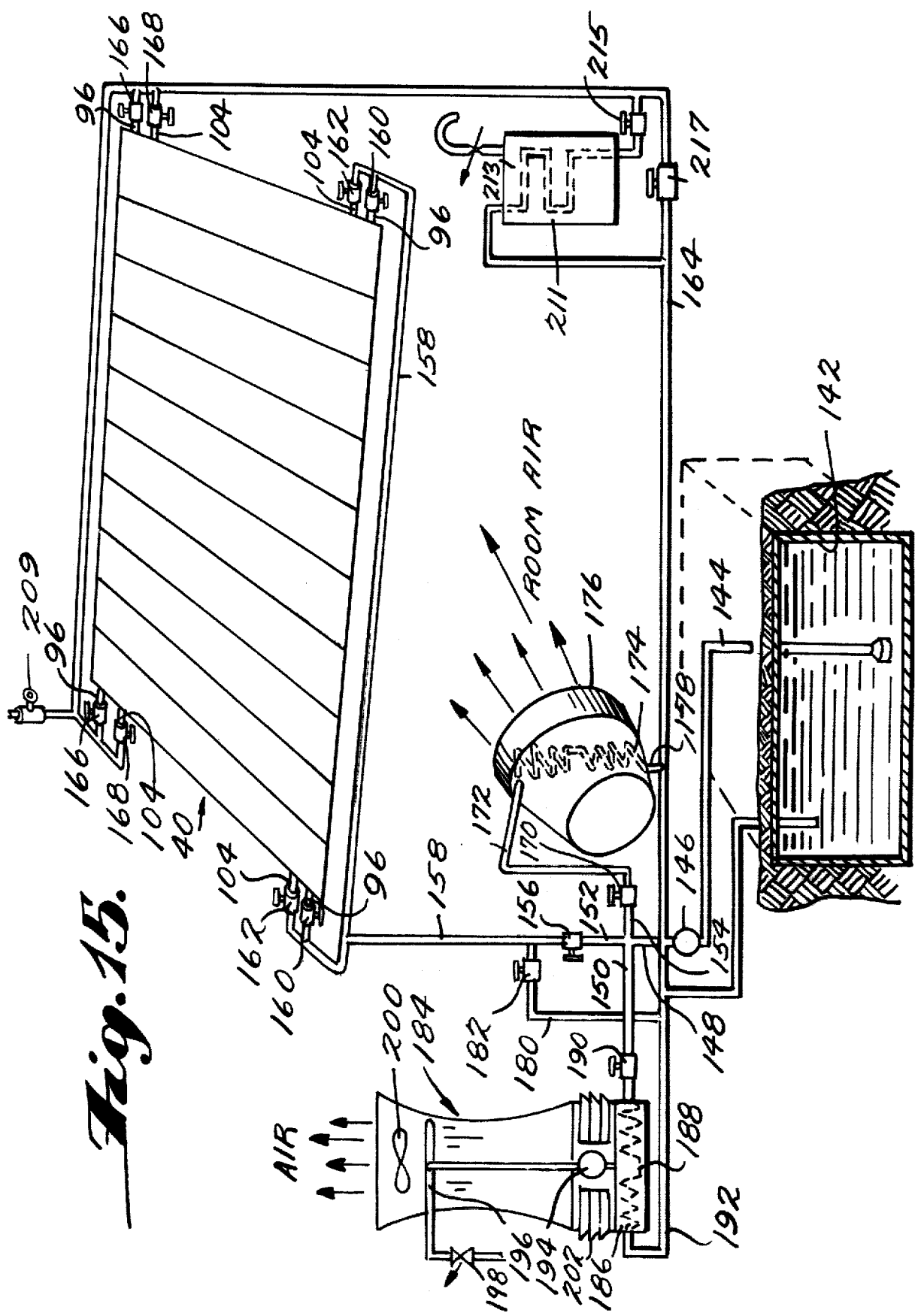

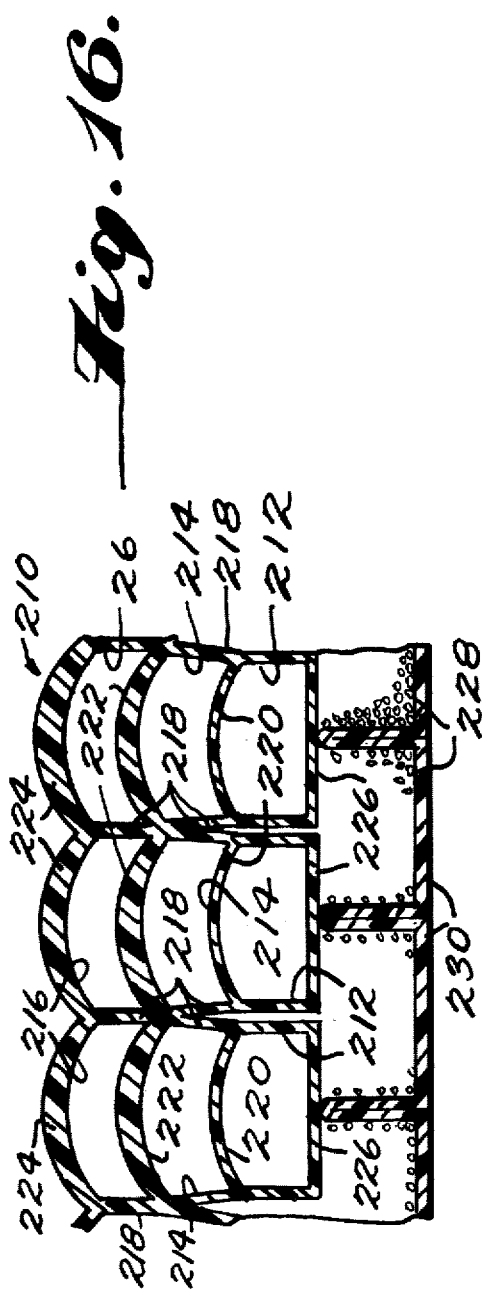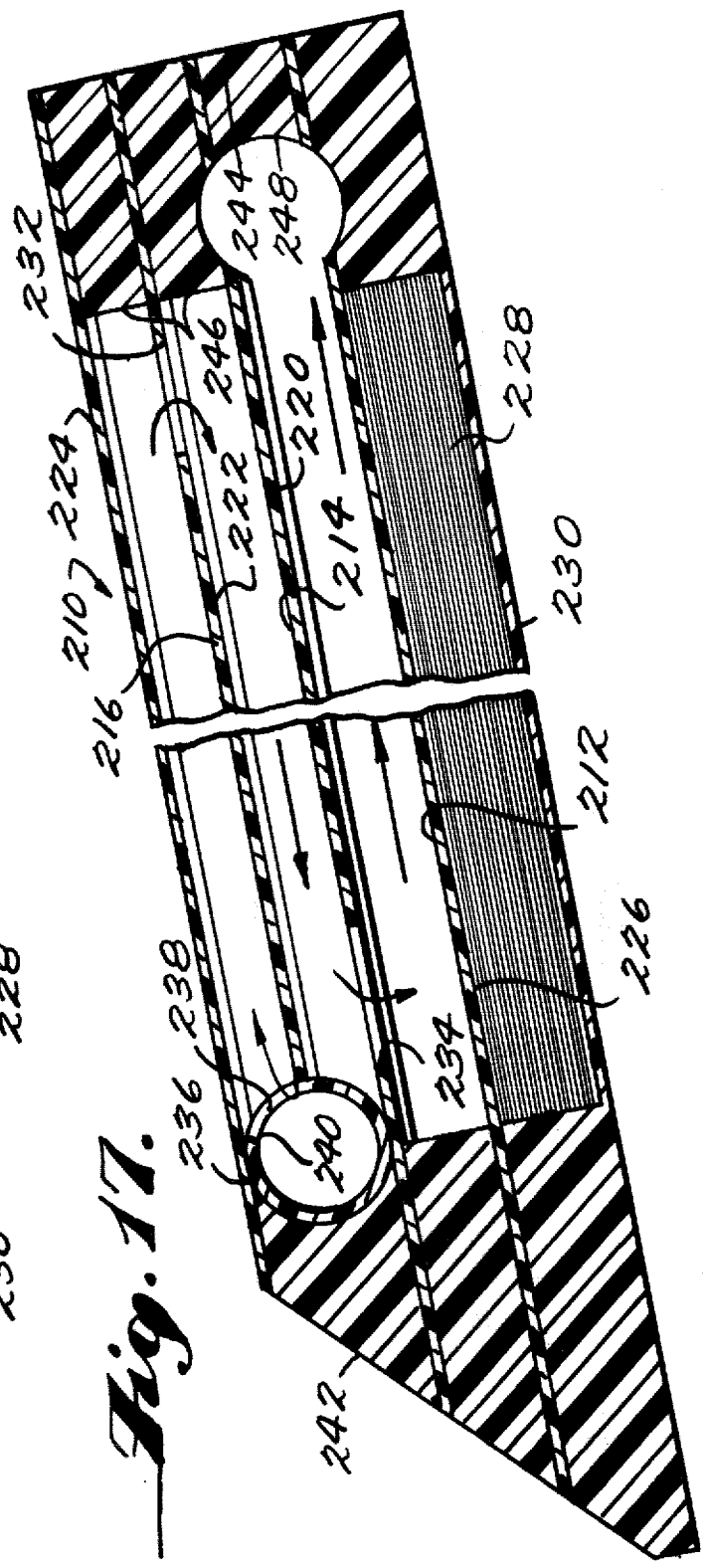

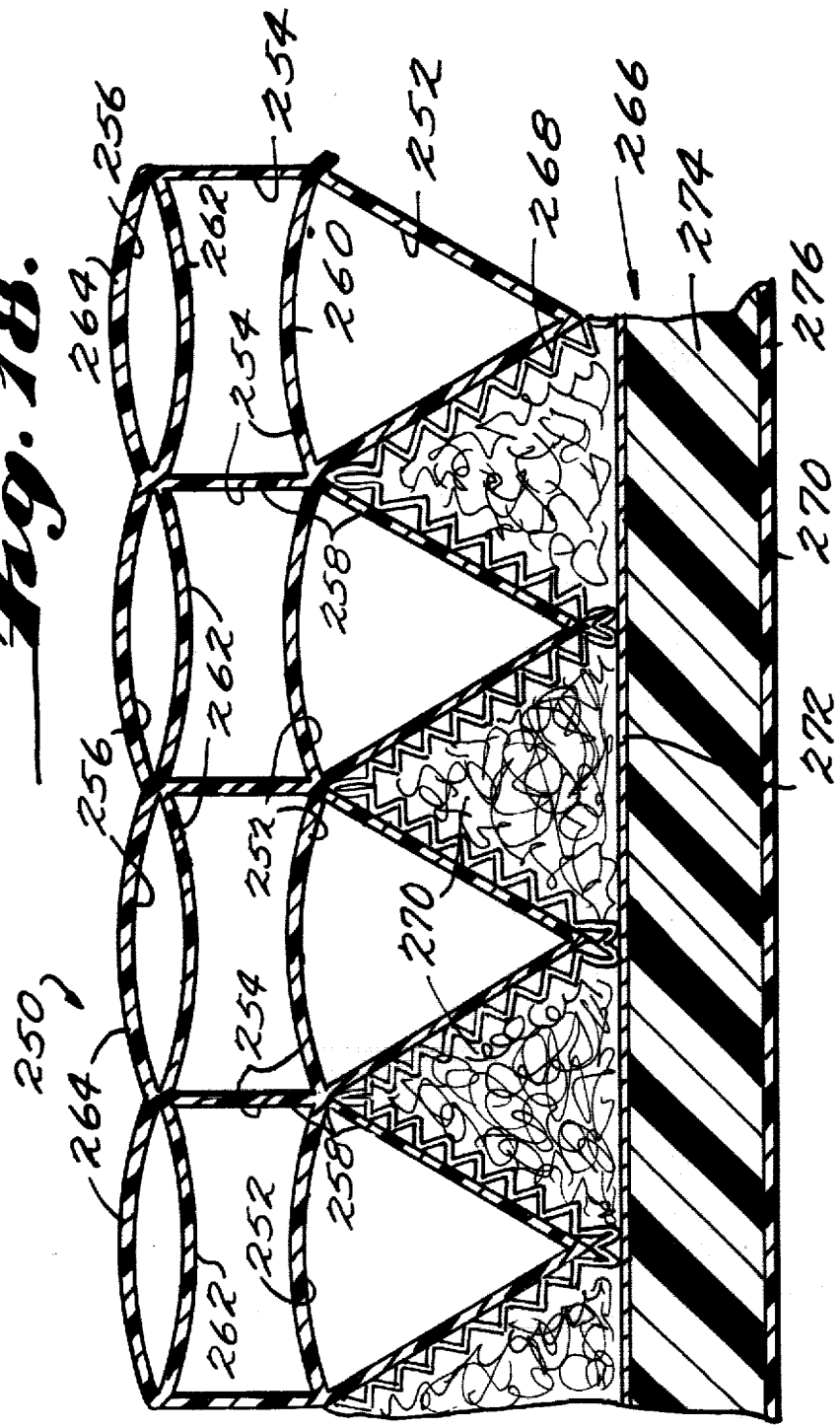

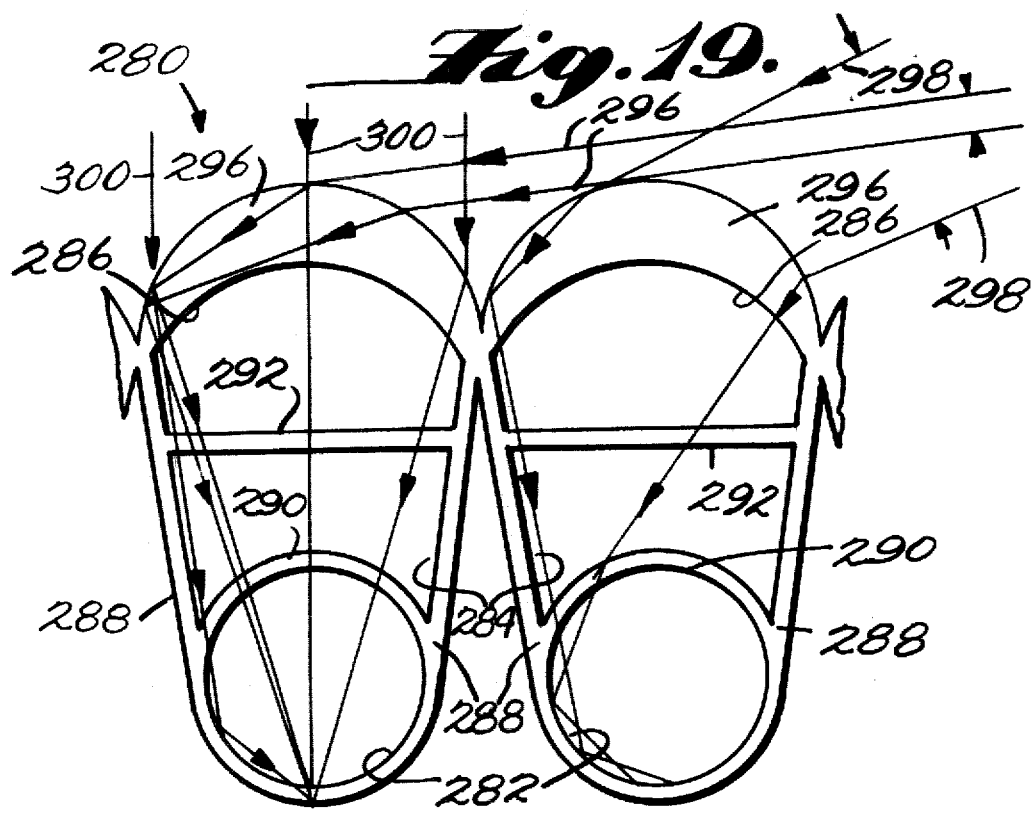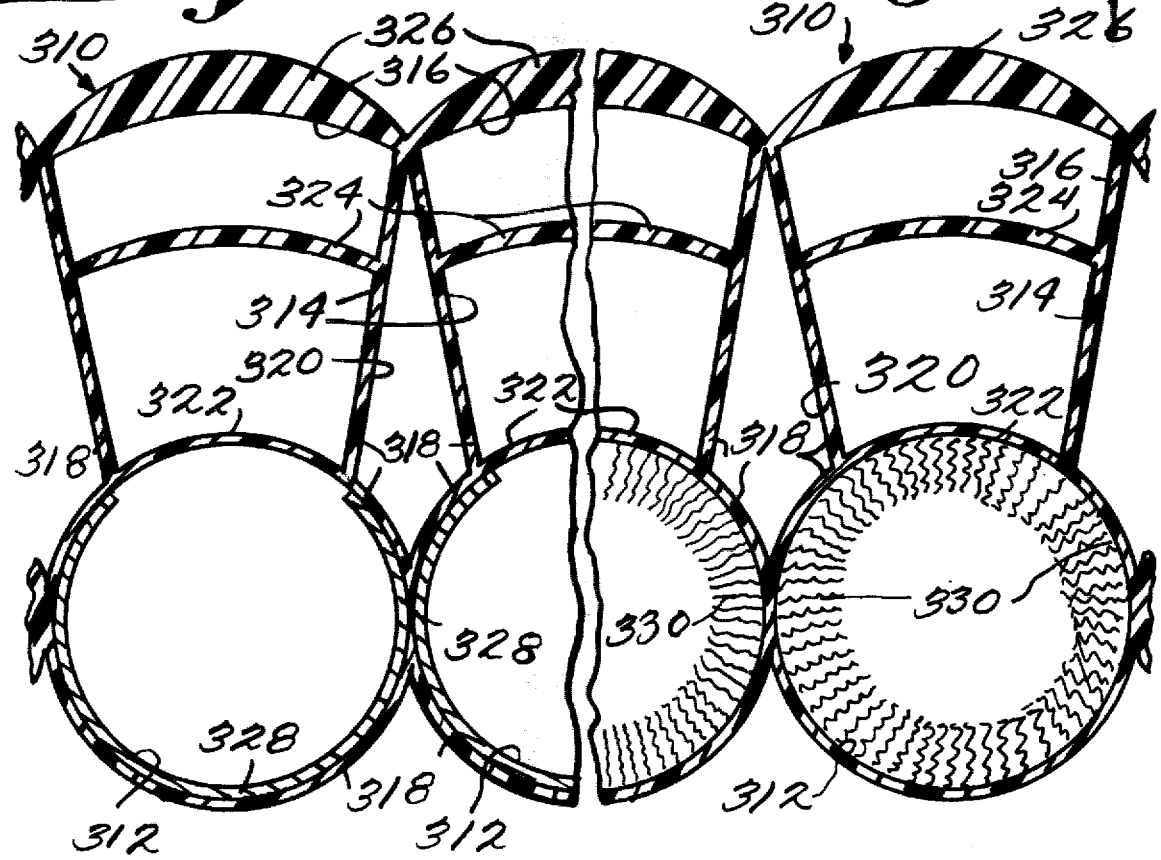

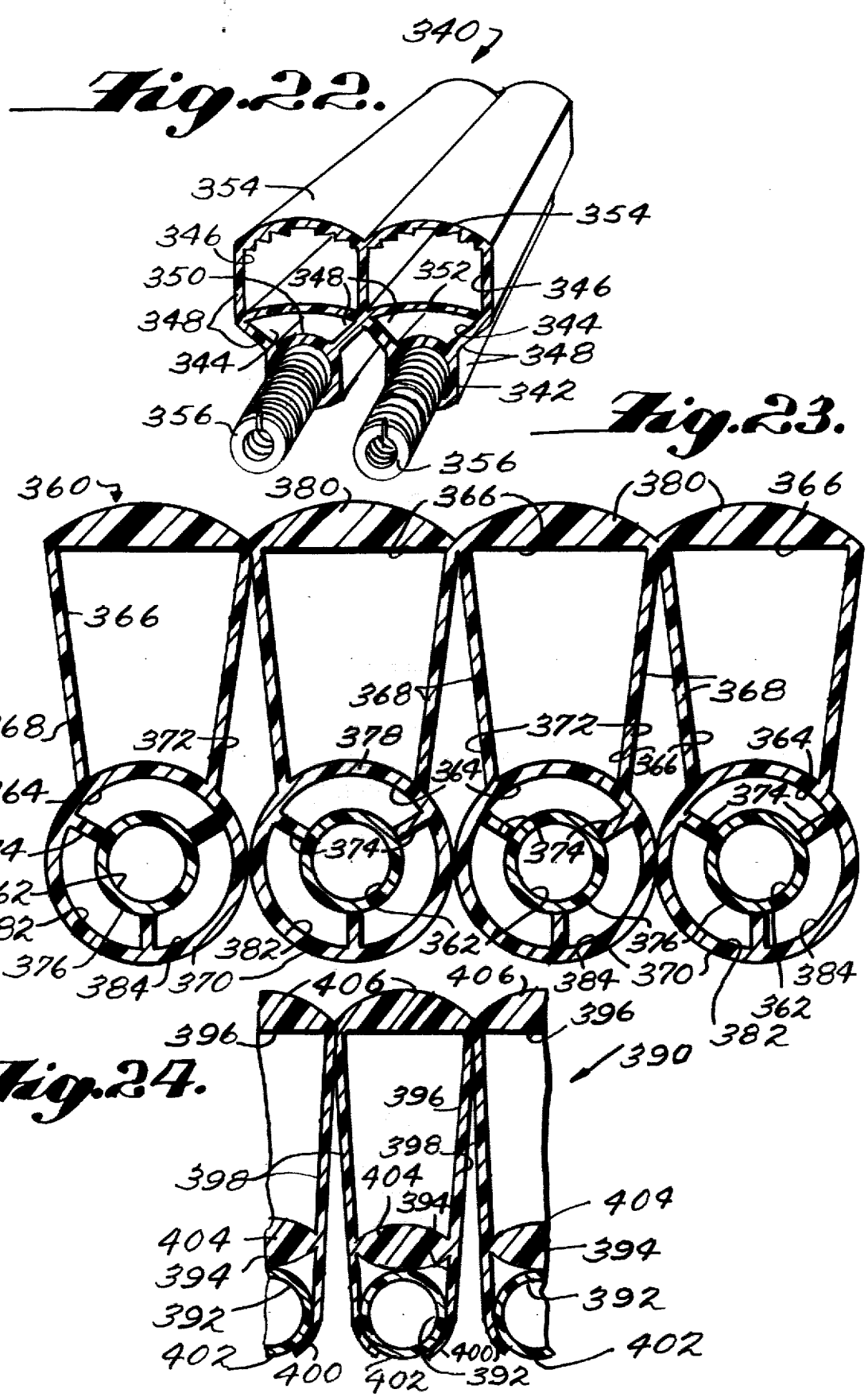

RADIANT ENERGY HEAT EXCHANGER SYSTEM

This application is a continuation of Ser. No. 860,779, Dec. 15, 1977, now abandoned, which is a continuation-in-part of my copending application Ser. No. 696,366, filed June 15, 1976, now abandoned.

This invention relates to solar energy and more particularly to an improved system for collecting solar radiant energy and dissipating radiant energy.

The basic principles of solar energy collection and radiant energy transfer for cooling are known and there have been many different proposed arrangements for accomplishing these basic purposes. While the need to utilize solar energy clearly exists and the basic principles by which solar energy can be utilized are known, the actual utilization is minimal. The most common explanation for this low utilization rate is that while known solar energy collectors work and have the capability to operate efficiently in a very economical and highly favorable ecological manner, the high initial costs for equipment thusfar made available commercially make the installations uneconomical in most instances. This is particularly true since, in most installations, there is a need for a conventional back-up system. For these reasons and others, there still exists a need for an effective radiant heat energy exchange system that can be produced on a large scale economical basis.

An object of the present invention is to provide a radiant energy heat exchange system that will neet the above-noted needs. In accordance with the principles of the present invention, this objective is obtained by providing a radiant energy heat exchanger panel structure which is manufacturable by known economical manufacturing methods from known economical materials and which has the necessary strength and structural integrity to withstand the rigors of installation and operation over an extended period of time while providing efficient operation. Also, a system which meets the aforesaid needs should, in accordance with the principles of the present invention, provide for the simple but effective installation of one or more panel structures in a manner which can be carried out with equipment requiring simple installation techniques. Further, the panel structures once installed should, in accordance with the principles of the present invention, provide an extensive range of versatility in the modes in which they can be operated. The objective of the present invention is obtained by utilizing one, or preferably a combination of two or more, of the constructional principles of the present invention which achieve one or more of the aforesaid prerequisite functions of operative efficiency, ease of installation and/or versatility of operation mode.

In accordance with the principles of the present invention, the radiant energy heat exchanger panel structure is formed of thermoplastic material either by bonding together formed thermoplastic sheets and/or preferably by extruding either a substantial part of the panel structure or the entire panel structure. The panel structure in accordance with the present invention provides a multiplicity of side-by-side inner fluid containing channel spaces and a corresponding multiplicity of outer fluid containing spaces. A preferred constructional principle is to form the plastic material which defines the outer surface of the panel structure into a multiplicity of outer sheet form wall sections, each one of which defines the outer portion of the outer fluid containing spaces and is of concavo-convex cross-sectional configuration with the convex surface thereof facing outwardly so as to provide (1) a multiplicity of side-by-side arches on the operable side of the panel structure which serve to enhance the load bearing capabilities thereof; (2) a multiplicity of side-by-side convex surfaces on the operable side of said panel structure which serve to enhance the range of the angle of incidence of radiant energy passable therethrough; and (3) a multiplicity of side-by-side lenses on the operable side of the panel structure which serve to concentrate the radiant energy passing therethrough. Where the formation of the construction is by extrusion, it is a preferred embodiment in accordance with the principles of the present invention to form the inner surface of each outer wall section with a series of transverse lens sections which extend longitudinally through the length of the wall sections. These transverse lens sections function in a manner similar to a Fresnel lens, that is, they enable the radiant energy passing through the outer wall sections to be even more concentrated while still maintaining the wall section with a thin outline configuration.

A preferred constructional principle embodied in the present panel structure is to provide an intermediate fluid containing space between each inner fluid containing channel space and associated outer fluid containing space. When this preferred arrangement is utilized, the intermediate wall sections which serve to separate the outer fluid containing spaces from the intermediate fluid containing spaces are preferably constructed in a manner similar to the outer wall sections. That is, they are of concavo-convex configuration in cross-section with the convex surface facing outwardly and preferably with either the inner or outer surface or both formed with a plurality of lens sections. This constructional configuration serves to further concentrate the radiant energy passing therethrough which already has passed through the corresponding outer wall section and outer fluid containing space.

In the preferred construction of the panel structure a panel base is provided which embodies a multiplicity of barrier walls. These barrier walls define with sheet form wall sections extending between the outer portions of adjacent barrier walls the aforesaid inner, intermediate and outer fluid containing spaces. Viewed in terms of the desirability of providing ease and simplicity of installation, it would be possible to finish off each panel structure during initial manufacture on a customized basis by cutting each panel structure to a predetermined design length suitable for the particular installation and by providing manifolding at each end. An alternative to such an arrangement which would provide a much greater versatility in installation is to effect length cut-off and manifolding at the installation site. Under these circumstances installation can be greatly facilitated by providing for the movement of the panel structure from a collapsed storage and transporting condition into an expanded operative condition. In accordance with the principles of the present invention this function can be achieved by forming each of the barrier walls by a pair of sheet form oppositely inclined wall sections which converge outwardly to define the outer portion of the associated barrier wall. With this arrangement the inner edges of each pair of inclined wall sections can be disposed in a collapsed storage and transporting condition in a relatively adjacent relationship with respect to one another. Such a relationship is achieved by rolling up the panel structure about an axis which is parallel with the longitudinal extent of the fluid containing spaces. When the rolled up panel structure is laid out on a generally planar roof section surface, the inner edges of each pair of inclined wall sections move outwardly from their adjacent relationship when in a collapsed condition. Preferably, the inner edges of each pair of inclined wall sections are interconnected by a wall section having a central front movable in a direction toward the outer portion of the associated pair of inclined wall sections. With this arrangement the central front wall sections limit the extent to which the inner edges of the inclined wall sections can move apart and provide a means for engaging a roof surface or a bat of insulation mounted thereon for effecting securement thereto when necessary.

Where the collapsed rolled-up panel structure condition is utilized as an expedient of ease in installation, it is also necessary to provide for the manifolding of the panel structure at the installation site. In accordance with the principles of the present invention, such manifolding can be easily and conveniently provided in one of two preferred configurations. First, such manifolding can be provided by simply injecting closed cell foamed plastic material into each open end of the panel structure and then forming a bore in the panel structure which extends transversely therein and in the body of foamed plastic material in a position inwardly of the now-sealed ends of the fluid containing spaces so that the foamed plastic material sealing the ends defines a side wall portion of the bore and another side wall portion thereof is open to the desired fluid containing spaces of the panel structure. Second, each end of the panel structure can be formed with an arcuate groove, as by a router or the like, which extends into the adjacent end of the fluid containing spaces of the panel structure to be manifolded. A tubular member is peripherally engaged within the groove which has a plurality of peripheral openings therein communicating with the associated end of each fluid containing space. A body of closed cell foam plastic material is then injected over the exterior of the tubular member so as to provide a seal between the exterior of the tubular member and the panel structure.

The second manifolding procedure indicated above which utilizes a tubular member, is preferred, since it results in a construction in which the end of the tubular member extends transversely outwardly of the panel structure, enabling such ends to be simply interconnected by exterior tubing and peripheral clamps during installation. Installation is further facilitated by the utilization of longitudinal strips which are secured to the upper surface of the roof section, the strips having upper surfaces shaped to provide a continuous elongated gutter extending the length of the roof section, preferably in a direction downwardly so as to handle any contained rain water or the like. By mounting such strips on the surface of the roof sections in parallel relation, the panel structures to be utilized can simple be positioned on the roof surface between adjacent strips. Fastening means is provided which cooperates with the strips and with the adjacent upper side edge portions of the panels to retain the panels in their operative position. This arrangement permits a high degree of thermal dimensional change in the panel without setting up excessive stresses since the panels are essentially free floating with respect to the roof surface.

With respect to the versatility function, it will be understood that by providing inner, intermediate and outer fluid containing spaces, three distinct modes of operation can be undertaken with the same construction. For example, where the panel sections are to be utilized as a system for heating swimming pool water, it is desirable to provide the greatest possible throughput capacity so as to raise the temperature of a large quantity of water a few degrees. Commensurate with this requirement, a first mode of operation involves the direction of the water from the pool into the outer fluid containing spaces at one end thereof so that the water will flow through the outer spaces to the opposite ends thereof. From the opposite ends of the outer spaces the water is directed into the intermediate spaces so that the water will pass therethrough to the opposite end and into the inner fluid containing channel spaces for passage therethrough and out of the panel structure. With this arrangement, a maximum amount of liquid is passed through the panel structures and retained therein a maximum residence time. A second heating mode particularly useful in wintertime for space heating requirements, or year around to supplement a conventional hot water heater, involves simply the passage of heating medium, such as water, through the inner fluid containing channel spaces, the intermediate and outer fluid containing spaces having air contained therein for insulating purposes.

Of significance in connection with the heating mode is the provision of valving for the intermediate fluid containing spaces which are operable to open the ends of these spaces to the atmosphere for the circulation of cooling atmospheric air through the spaces in the event that the flow of heating medium through the inner spaces should inadvertently cease or be drained therefrom. Where the panel structure is mounted on a roof having sufficient inclination, a chimney effect will induce sufficient flow of atmospheric air through the intermediate fluid containing passages to prevent overheating of the panel material by the solar energy when the presence of or flow of heating medium is somehow inadvertently disrupted.

A cooling mode particularly useful during summer evenings involves simply the passage of cooling medium, such as water (mixed with an anti-freeze ingredient), through the intermediate fluid containing spaces, the outer and inner fluid containing spaces having air contained therein for insulating purposes.

These and other objects of the present invention will become more apparent during the course of the following detailed description and appended claims.

The invention may best be understood with reference to the accompanying drawings, wherein an illustrative embodiment is shown.

In the drawings:

FIG. 1 is a front elevational view of one form of a radiant energy heat exchanger panel structure embodying the principles of the present invention;

FIG. 2 is an enlarged, fragmentary sectional view taken along the line 2—2 of FIG. 1;

FIG. 3 is a fragmentary sectional view taken along the line 3—3 of FIG. 1;

FIG. 4 is an enlarged fragmentary sectional view taken along the line 4—4 of FIG. 1;

FIG. 10 is an enlarged fragmentary end view of another panel structure embodying the principles of the present invention;

FIG. 11 is a sectional view taken along the line 11—11 of FIG. 10;

FIG. 12 is a sectional view taken along the line 12—12 of FIG. 10;

FIG. 13 is a fragmentary perspective view of a panel structure roof system embodying the panel structure shown in FIG. 10;

FIG. 14 is an enlarged fragmentary sectional view taken along the line 14—14 of FIG. 13;

FIG. 15 is a schematic view of a heating and cooling system embodying the panel structure roof system of FIG. 13;

FIG. 16 is a view similar to FIG. 10 showing still another panel structure embodying the principles of the present invention;

FIG. 17 is a sectional view taken along the line 17—17 of FIG. 16;

FIG. 18 is an enlarged fragmentary sectional view of a modified form of panel construction embodying the principles of the present invention;

FIG. 19 is an enlarged fragmentary sectional view of an extrusion of modified form constituting a part of a panel structure embodying the principles of the present invention;

FIG. 20 is a view similar to FIG. 19 illustrating a modified form of panel construction;

FIG. 21 is a view similar to FIG. 20 illustrating

FIG. 22 is a perspective view partly in section showing an extrusion of modified form having aluminum helical targets in the inner spaces thereof which form a part of a panel construction embodying the principles of the present invention;

FIG. 23 is a view similar to FIGS. 30 and 21 of a further modified form of panel construction; and FIG. 24 is a view similar to FIG. 19 of still another form of panel extrusion embodying the principles of the present invention.

Figure 8:
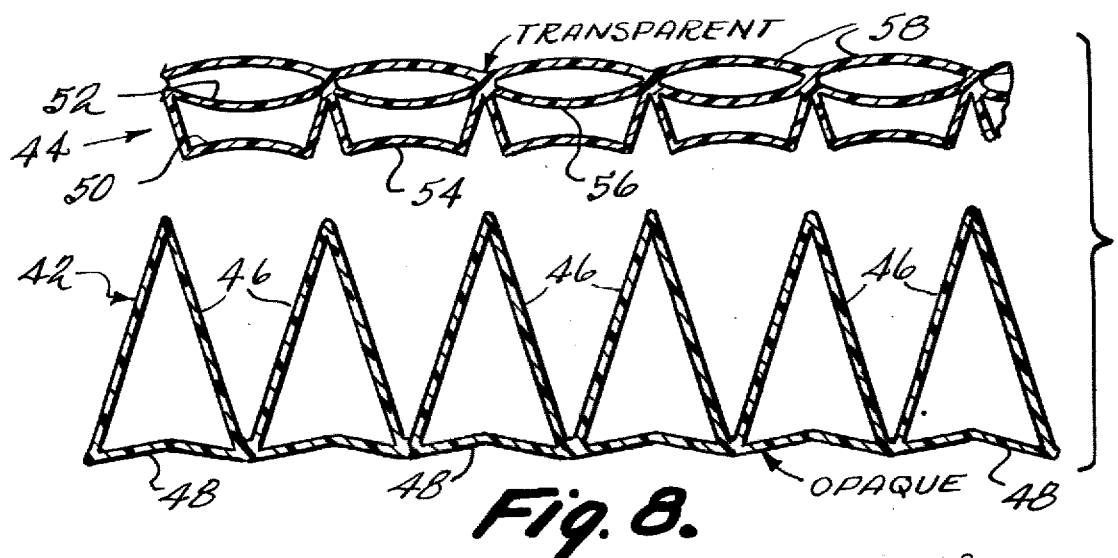
FIG. 8 is a view similar to FIG. 6 illustrating the component parts of the panel structure shown in FIG. 5 in a position which they may assume during assembly.

Referring now more particularly to FIGS. 1-4 of the drawings, there is shown therein a panel structure form of a solar energy collector or radiant energy heat exchanger, generally indicated at 10, embodying the principles of the present invention. The radiant energy heat exchanger panel structure 10 is formed essentially of laminated sheet structure from relatively inexpensive moldable plastic materials. As best shown in FIG. 2, the laminated sheet structure of the panel structure 10 has a relatively rigid panel form providing an operative side of substantial area to be mounted in a position to receive the solar energy and an opposite coextensive side which may be regarded as a mounting side, both sides being bounded by a relatively thin periphery.

In the preferred embodiment shown the mounting side of the panel structure 10 is provided by a base layer 12, which may be regarded as a relatively thick sheet formation, preferably made from a suitable foamed plastic material, such as urethane, styrene or urea formladehyde. The base layer 12 is thus characterized by lightness of weight and rigidity. Moreover, by utilizing injection molding techniques to form the base layer 12 of foamed plastic material, the base layer 12 may be conveniently formed with configurations embodying the principles of the present invention. As best shown, one side 14 of the base layer 12 is planar and this side defines the mounting side of the panel structure 10. The opposite side of base layer 12 is formed with a multiplicity of upstanding barrier walls, adjacent pairs of which provide cooperating pairs of angularly related inclined surfaces 16, each pair of surfaces 16 diverging outwardly with respect to one another in a direction away from the planar side 14 to cooperatively define an elongated channel shape.

While it is within the contemplation of the present invention that the surfaces 16 of the foamed plastic of the base layer 12 provide both the heat retention function of the opaque walls and the fluid impervious function of fluid passages, it is preferred to adhere a barrier film or sheet 18 to these surfaces to provide both functions. Desirably, the film 18 is initially vacuum formed and then held against the upper surface form of the mold as the plastic foam is added during the molding of the base layer 12. The film 18 is opaque and may be of any desired color. Suitable plastic materials for the film 18 include polycarbonates, acrylics, polyvinyl chlorides, polypropylene, polysulfone, polyvinyl fluoride, rubber compounds, etc. It will also be understood that the barrier film 18 may provide only the fluid impervious function in which case a sprayed-on coating or integral skin may provide the opaque function.

The sheet formation of the panel structure is completed by the provisions of three transparent plastic sheets 20, 22 and 24 mounted over the base layer 12 and barrier film 18.

The lower film sheet 20 is bonded on the upper ridge or outer portions of the barrier walls which are defined exteriorly by barrier film 18 in the configuration shown in FIG. 2. The bonding of the sheet 20 is such that wall sections thereof extend across the outer portions of adjacent barrier walls and define with the remaining inner unbonded portions of the barrier walls a multiplicity of closed fluid containing channel space 26.

Film 20 is bonded on the upper ridges of barrier layer 18 in any suitable manner, such as by heat welding, solvent welding, or adhesive bonding techniques. A preferred manner is to utilize the heat available from channel molds which hold film 18 to soften film 20 sufficiently to produce welding to barrier film 18 when the surfaces are joined under mold pressure. Sheets 22 and 24 are bonded along strips or lines at the ridge peaks in a similar manner. The lower surface of the sheet 22 extending between each pair of adjacent outer portion peaks defines with the coextensive upper surface of the sheet 20 an intermediate fluid containing space or lower insulating air space 28. Likewise, the upper surface portions of the sheet 22 define outer fluid containing spaces or upper insulating air spaces 30 with the coextensive lower surface portions of the sheet 24. Sheet 22 is intentionally formed to the bridged surface shown, as is film sheet 20 for purposes of allowing for uneven expansion and contraction of the various members in response to climateological and application conditions. Upper sheet 24 is somewhat thicker than films 18, 20 and 22, and is selected to offer protection from projectiles, hail, and other hazards, in addition to confining insulating air within space 30.

The panel structure 10 is preferably made to be a self-contained unit by manifolding the ends of the channels 26 and the air spaces 28 and 30. This may be accomplished in any desired fashion, however, as illustrated in the drawings, the manifolding embodies the provision of a tapered manifold trough surface at each end of the base layer 12 which is covered with the barrier film 18 to form a tapered manifold trough 32 communicating with the associated end of the channels 26.

Communication with each manifold trough 32 exteriorly of the panel 10 is provided by any suitable means, such as plastic pipe sections 34, which is either mounted within cavities molded in the base layer or provided in situ at the time the base layer is molded. Any portion of the film 18 covering the adjacent end of each pipe 34 during assembly is simply cut away.

Each manifold trough 32 is preferably enclosed and sealed about the associated pipe 34 by means of the adjacent portions of the three sheets 20, 22 and 24. As best shown in FIG. 4, the portions of the sheets 20, 22 and 24 which overlie each manifold trough 32 are spaced apart from each other and remain unsecured. The end portions of the three sheets 20, 22 and 24 which overlie the end wall of the base layer 12 defining the associated manifold trough 32 are secured together in sealed relation and to the upper surface of the base layer. In this way, the portions of the sheets 20 and 22 overlying each manifold trough 32 define a manifold space for the adjacent ends of the lower air spaces 28, while the portions of the sheets 22 and 24 overlying each manifold trough define a manifold space for the adjacent ends of the upper air spaces 30.

Prevention against over-heating due to insufficient heat removal rates is an important consideration in instances where failure of the fluid circulation system would allow system temperatures to exceed material or fabrication limits. Most applications involve placing the panel structures 10 on somewhat inclined surfaces. This facilitates gathering maximum amounts of solar energy, draining the system for cleaning and freeze protection, and for draining surface moisture following snow or rain showers. Pressure and temperature control for the air spaces 28 and 30 can be provided by the use of conventional valving illustrated schematically in FIG. 1 of the drawings at 36 and 38. In the schematic arrangement shown, an opening (not shown) is formed in the portion of the intermediate sheet 22 overlying the manifold trough and underlying the valve 36 so as to communicate the manifold spaces of both air spaces 28 and 30. It will be understood that the manifolds for the air spaces 28 and 30 may be maintained separate and provided with separate valves, if desired. Buoyant forces resulting from heating air masses between the transparent films result in mass flow of the heated air out valve 36 as illustrated in FIG. 1 when such valve is open. Control of valve 36 can be provided by constructing the valve of materials which have high thermal expansion coefficients resulting in automatic opening at predetermined temperatures. Another type of automatic control is to operate valve 36 by solenoids and provide normally-closed-power-on functions with valve opening to occur in case of power failure or any other failure resulting in deficient fluid flow. The specific construction of valves operated by material expansion-contraction forces or solenoids is well-known and need not be further discussed in this disclosure. Providing valves 38 at lower extremities to allow cool air to replace hot air passing through valve 36 thus enables maintenance of the system within design temperature. In areas where airborne dust prevails, filter strips over the vent valve inlet areas may be required to prevent build-up of dust on internal surfaces.

It will be understood that panel structures 10 in the unitized form described above are arranged to be installed with procedures normally utilized in installing other types of wall or roofing panels with appropriate connections to the pipes 34 of the panels. Normally, the panel structures 10 will be regarded as add-on panels rather than panels which also serve as the exterior protective paneling as well. Nevertheless, such dual functioning is contemplated although other embodiments of the present invention hereinafter described are preferred in such dual functioning situations. Factory assembled panels including layers 12, 18, 20 and 22 may be utilized as a combination collector and membrane roof surface with a sheet 24 applied as a continuous glazing for exclusion of water. Characteristic materials selection for the sheets or films 20, 22 and 24 are the same as those of film 18, namely, polycarbonates, acrylic, polyvinyl chloride, polyvinyl fluoride and rubber compounds.

Figures 6, 7:
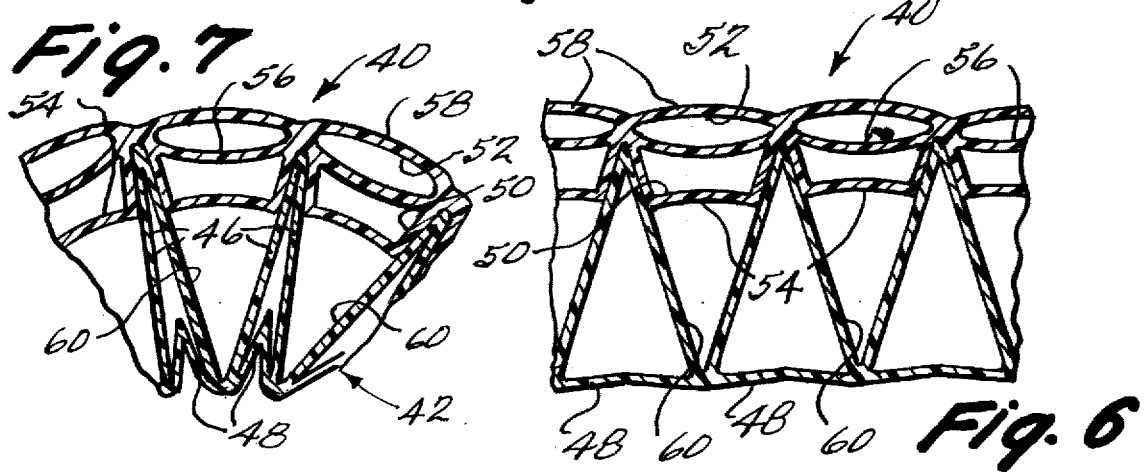
FIG. 6 is an enlarged fragmentary sectional view taken along the line 6—6 of FIG. 5.
FIG. 7 is a view similar to FIG. 6 showing the manner in which the panel structure is rolled up for transportation and storage.

Referring now more particularly to FIGS. 5–9, there is shown therein a second embodiment of the present invention which facilitates manufacture and application of relatively large collection areas. A rigid characteristic such as provided by the panel structure 10 is not utilized but instead a rolled mat form, generally indicated at 40, which facilitates shipping and storage much like large carpets or sheet-like floor coverings. Production of 100' wide "continuous" lengths for purposes of reducing manufacturing and application costs is offered for large heat collection requirements. The thickness of the embodiment as shown in the enlarged section of FIG. 6 is typically less than ¾".

In its preferred form the rolled mat panel structure 40 is made up of two plastic extrusions 42 and 44 suitably bonded together in a manner hereinafter more fully explained. The extrusion 42 constitutes the base layer of the panel structure 40 similar to the base layer 12 and film 18 previously described of the panel 10. Extrusion 42 is formed of opaque plastic material, whereas extrusion 44 is formed of transparent plastic material and is comparable to the transparent sheets 20, 22 and 24 of the panel 10.

As best shown in FIGS. 6–8, opaque extrusion 42 has a cross-sectional configuration which provides cooperating pairs of walls 46 defining a V-shape which diverge outwardly in a manner similar to the comparable walls of the film 18. The free edge of each leg of the V-shaped walls is integrally joined with the free edge of an adjacent leg of adjacent pair of walls. Moreover, the lower apexes of adjacent V-shaped walls are integrally interconnected with inwardly foldable wall sections 48.

Extrusion 44 has a cross-sectional configuration which defines a series of side-by-side intermediate and outer fluid containing spaces or lower and upper air spaces 50 and 52, similar to the air spaces 28 and 30 previously described, each of which is provided by lower, intermediate and upper thin wall sections 54, 56 and 58 integrally joined with each other along opposite edges and with adjacent opposite edges of adjacent wall sections 54, 56 and 58.

Figures 5, 9:
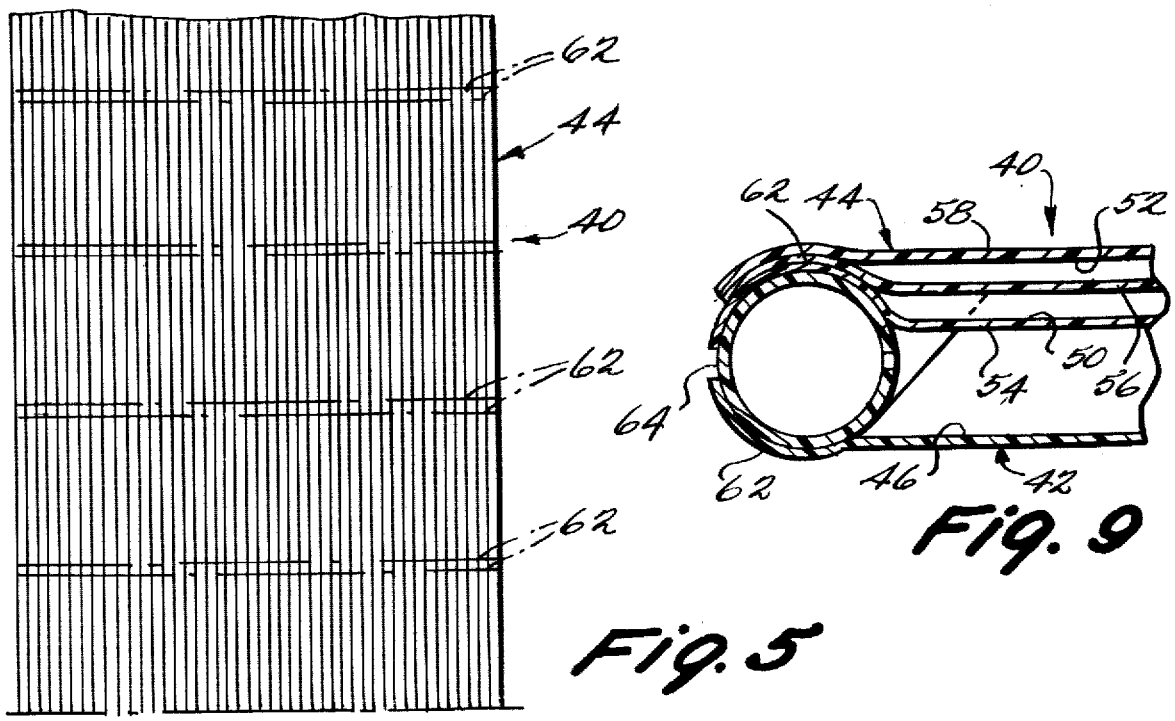
FIG. 5 is a fragmentary front elevational view of another form of panel structure embodying the principles of the present invention.
FIG. 9 is a fragmentary sectional view illustrating one configuration for manifolding the panel structure shown in FIG. 5.

Assembly of the upper transparent extrusion 44 on the lower opaque extrusion 42 is by heat bonding in the configuration shown wherein the wall sections 54 extend across the wall sections 46 to form enclosed fluid channels or fluid containing channel spaces 60 (FIG. 6), similar to the channels 26 previously described. As best shown in FIG. 5, the bonding is interrupted periodically along the length of the extrusions, as indicated by the phantom lines 62, for a purpose hereinafter to be more fully explained.

For shipping and storage a length of assembled extrusions 42 and 44, as for example 144 inches, is cut from the continuously formed and assembled extrusions. Such length may contain 6 to 8 unbonded sections. The length is then rolled up like a rug with the assembly assuming the curvature as shown in FIG. 7. It will be noted that the wall sections 48 fold inwardly to permit the rolling-up action. In application, the panel structure 40 is typically oriented with the water passageways or channels 60 extending along the slope of the surface that the panel structure is attached to. Unrolling the system while simultaneously stretching wall sections 48 flat over the surface to which a suitable adhesive has been sprayed produces a rigidized large area collector system. To facilitate connection of the panel structure to inlet and outlet conduits, the panel structure is cut along the center of the unbonded sections 62 which upper and lower extrusions 42 and 44 produce two flaps of bonding over perforated inlet and outlet tubing 64, as is clearly illustrated in FIG. 9. For widths less than the manufactured width, the panel structure 40 may be cut along any water channel line and sealed at each end. Thus, rectangular areas of nearly any width and length dimensions can be accommodated with the rolled mat panel structure 40.

In operation, both embodiments employ the multiple layers of plastic material to reduce heat loss from the water within the channels. The upper transparent sheets or thin wall sections produce a layer of stagnant air between it and the inner sheets or wall sections, thus preventing wind cooling of the inner panel structure materials. The middle sheet or wall section reaches a temperature more or less equal to the water channel material and thus blocks radiation from the water channel to the cool portions of the sky around the sun. The air spaces next to the water channels insulate with the middle film promoting equalization of water channel and middle film temperatures. In applications where surface winds are minimized by architectural features or landscaping, the middle sheet 22 or wall sections 56 may be omitted without serious loss in collection efficiency.

Prevention of overheating during periods when fluid circulation through the inner, intermediate, or outer channels is not possible can also be achieved in the embodiment of FIG. 6 by circulation of ambient air through the inverted "V" spaces formed by barrier walls 60 and 48. As previously described, suitable electromechanical or thermomechanical valve means (not shown) may be employed to admit cooling fluids through the inverted "V" spaces bounded by walls 60 and 48 when cooling of the panel structure is desired.

The extended surface represented by the wetted area of the lower channel defining wells of the embodiments provides an opaque absorber for radiation passing through the transparent films and water within the channels. Light rays not totally absorbed and converted into heat are reflected toward opposite walls thereby considerably increasing (compared to conventional flat plate schemes) conversion of available insolence into heat energy. Radiation from the opaque wetted surfaces are at infrared wavelengths which are efficiently absorbed by the water in the channels. Heat loss through radiation is limited by the relatively small transparent area perpendicular to a cooler sink. Thus, the system operates as a radiation trap having a collection area effectively larger than its loss area by the ratio of the wetted opaque area to the wetted transparent area. Essentially the same analysis applies to the opaque portion with respect to transparent portion where the medium being heated within the channel is air instead of water.

Relative dimensions including the included angle between the wetted walls defining the channels, the length of wetted wall compared to dry walls, and film thicknesses can be imperically optimized for minimum total costs. Resulting configurations which utilize polycarbonate material selections included angles between 30° and 60° with 1/16" minimum air spacings between the transparent films. Increasing the minimum air spacing and/or decreasing the included angle increases the water temperatures achievable. However, overheating the plastic film may result during fluid circulation failures unless outside sprinklers, shade, or venting of the stagnant air layers are provided to prevent operation beyond design temperatures. Utilization of glass or other high temperature material selections for the transparent members would increase the acceptable design temperatures but long useful lives have been achieved for water temperatures of 170° F. in embodiments using polycarbonate transparent films. Thus, external sprinkling to prevent operation beyond design limits and for purposes of rinsing the system to maintain dust free transparent surfaces has proved preferable to more expensive material selections.

Improvement of low sun angle collection compared to flat glazed flat plate collectors is also offered by thermo-forming upper sheets or thin wall sections. Optimum curvatures and lens profiles differ with the angle of inclination to the sun and with the chosen included angle. It is intended that local manufacturers of the invention provide optimized curvature of upper sheet 24 or upper wall sections 58 for local conditions of low angle collection. In relatively cool Northern ambients where relatively high humidities prevail, the included angle may be 30° and the sections of sheet 24 of wall sections 58 may be curved on a 1" radius. In hot, dry climates the included angle may be 60° and the sheet 24 or wall sections 58 may be curved on a 2" radius.

Referring now more particularly to FIGS. 10-14, there is shown therein another form of a radiant energy heat exchanger panel structure, generally indicated at 70, embodying the principles of the present invention. The panel structure 70 is similar to the panel structures 10 and 40 in that there is provided a multiplicity of side-by-side inner fluid containing channel spaces 72, a corresponding multiplicity of intermediate fluid containing spaces 74 and a corresponding multiplicity of outer fluid containing spaces 76. The panel structure 70 differs from the panel structures previously described in that all of the fluid containing spaces are defined by thin wall sections formed from a single extrusion. The extrusion provides a multiplicity of barrier walls 78, each of which is defined by a pair of sheet form oppositely inclined wall sections converging outwardly. It will be noted that the outwardly converging portions of each pair of inclined wall sections constitute the outer portions of the barrier walls 78 of which the wall sections separating the various spaces are integrally connected.

As shown, these wall sections include an inner sheet form wall section 80, an intermediate sheet form wall section 82 and an outer sheet form wall section 84. Preferably, each of the wall sections 80, 82, and 84 is of concavo-convex cross-sectional configuration with the convex surface thereof facing outwardly.

Each outer wall section 84, like the comparable outer wall section 58 of the embodiment shown in FIGS. 5–9, by virtue of the aforesaid concavo-convex configuration, serves to provide (1) a multiplicity of side-by-side arches on the operable side of the panel structure which serve to enhance the load-bearing capabilities thereof; (2) a multiplicity of side-by-side convex surfaces on the operable side of the panel structure which serves to enhance the range of the angle of incidence of radiant energy passable therethrough; and (3) a multiplicity of side-by-side lenses on the operable side of the panel structure which serve to concentrate the radiant energy passing therethrough. Preferably, in order to provide for still further concentration of the radiant energy passing through the outer wall section 84, each outer wall section is extruded so that there is formed in one surface thereof, preferably the interior surface as shown, a series of transverse lense sections 86 extending longitudinally throughout the longitudinal extent of the associated outer wall section. It is also preferred in order to provide still further concentration of the radiant energy passing through the wall sections defining the outer fluid containing space 76 to extrude the intermediate wall 82 so that there is formed on one surface thereof, preferably the outer surface as shown, a corresponding series of transverse lens sections 88. The lens sections 86 and 88 are constructed in accordance with the principles attributable to Fresnel and commonly known as Fresnel lens. In lens terminology, the concavo-convex wall sections and the lens sections therein are converging or positive lenses in relation to incoming solar rays.

With the single extrusion embodied in the panel structure 70, the opaqueness previously described is preferably provided by coating the inner surfaces of the pairs of inclined wall sections defining the barrier walls 78. Such coating is preferably white or metallic colored, rather than dark, for purposes of reflecting the radiant energy rays which strike the surface so that the rays after such reflection will pass through the fluid medium contained within the inner fluid containing channel spaces 72. The panel structure 70 is finished by providing a base layer which may be a layer of foamed plastic similar to that provided in the panel structure 10 or such base may include simply the provision of centrally foldable wall sections integrally extruded in a manner similar to the wall sections 48 of the panel section 40. However, the base layer as shown consists of a series of bundles of glass filaments 90 lightly impregnated with a fiberglass type resin and encased within a thin sheet of polyvinyl chloride 92 (e.g. thickness of 0.003"). The encasing film or sheet of polyvinyl chloride has its outer edges sealed as by heat welding to the sides of the panel structure 70 and includes a multiplicity of upwardly extending folds which are secured to the inner surfaces of the wall sections defining the inner portion of each inner fluid containing channel space 72. The arrangement is such that the fiberglass filaments are not retained in a rigid condition by the impregnating resin but are capable of some relative movement which is limited by the flexibility of the film 92. This arrangement is considered desirable since it allows the panel structure to conform with the inevitable uneven areas on the roof surface to which the panel structure is mounted. The flexibility of the base layer is of further functional advantage in the installation of the panel as will become more apparent hereinafter. The arrangement is such that a certain flexibility is provided although a panel provided with the base layer of this type cannot be truly regarded as a rolled-up panel in the same sense as the panel structure 40. The arrangement shown is particularly desirable in that, by providing a supply of polyvinyl chloride film 92 and elongated fiberglass bats, the base layer can be assembled and fused to the extrusion shortly after the extrusion has taken place and the material forming the extrusion is still hot. The preferred material for the extrusion is clear polycarbonate.

It will be understood that in connection with a processing and assembly procedure such as indicated above, the composite extrusion with base layer applied thereto would be cut into lengths and suitably handled in desired lengths. The procedure also lends itself to the application of manifold tubes to the cut ends of the panel structures while the extrusion is still hot. However, the formation of manifold tubes at each end of the panel structure predetermines the length of the panels available. While an arrangement of this type is desirable for installations where the panel length dimension is known in advance, it is preferable to provide for the manifolding of at least one end of the panel structure at the time of installation and preferably both ends. A preferred manner of accomplishing on-site manifolding is illustrated in FIGS. 11 and 12.

In the arrangement shown, manifolding is provided at opposite ends of the inner fluid containing channel spaces 72 and opposite ends of the intermediate fluid containing spaces 74. The panel structure in its longitudinal cross-sectional configuration is shown as applied to an inclined roof section in which one of the ends of the fluid containing spaces is disposed above the other ends thereof. The end portion of the panel structure which is disposed upwardly has its end surface retained at the right angle transverse cut provided at the factory. The initial step in providing the manifold is to cut a transversely extending groove 94 in the end surface of the panel structure which communicates with the ends of the inner fluid containing spaces 72. This cut may conveniently be formed by a router or portable routing machine. The inner surface of the groove is of convex semi-cylindrical configuration of a diameter conforming with the diameter of a tubular member or pipe 96 which preferably is made of suitable plastic material as, for example, polyvinyl chloride.

The tubular member has formed in a side wall thereof a multiplicity of openings 98. Each of the openings 98 is of a shape and size which will communicate with the interior of an associated inner fluid containing space 72. In this way, the end surface of the wall section 78 which is formed when the groove 94 is cut will engage the side wall of the pipe so as to at least partially surround the confines of the associated opening 98. It will be noted that the transverse dimension of the tubular member 96 is greater than the transverse dimension of the panel structure so that an end portion of the tubular member will protrude transversely from each side of the panel structure. With the tubular member 96 positioned as indicated, the operator then applies foamable plastic material 100 (e.g. polycarbonate foam) to the exposed exterior surface of the end of the panel structure. Such foam enters the ends of the inner fluid containing spaces 72 and as soon as the plastic material expands into foamed relationship with closed cells a seal is provided in the ends of the spaces 72. The foamed plastic also serves to seal the exterior of the tubular member in relation to the exterior of the wall sections defining the inner fluid containing channel spaces 72 so that each opening 98 in the tubular member is in fluid-tight communication with its associated space. In addition to providing for a seal between the manifold tubular member 96 and the structure of the panel, the foamed plastic material also provides insulation for the exterior of the manifold tubular member.

In the embodiment shown, the adjacent ends of the intermediate fluid containing spaces 74 are manifolded in conjunction with the manifolding of the inner spaces 72. Such manifolding is accomplished by routing transversely extending arcuate groove 102, placing a transversely extending tubular member or pipe 104 in the groove having openings 106 therein communicate with the interior of the spaces 74 when so positioned and applying a body of foamed plastic material 100 thereto which is preferably at the same time that the body of plastic material 100 is applied to the associated pipe 96.

It will be understood that the lower end is manifolded in a similar fashion except that the end edge portion of the panel structure is cut with a 45° inclination as indicated at 108 prior to the formation of the grooves 94 and 102 therein. It will be understood that with this arrangement the length of the panel can be made to conform with the length required at the particular installation without regard to establishing any predetermined length at the factory.

The above-described procedure for manifolding the ends of the panel structure 70 is simple and provides the advantages of insulation to the manifolding and for that reason is likewise suitable in factory manifolding as well. Where the predetermined length is to be utilized the base layer consisting of the fiberglass batting engaged with the polyvinyl chloride film would be foreshortened with respect to the overall length of the panel provided, so that the base layer would extend essentially from the manifold tube at one end to the manifold tube at the other.

Referring now more particularly to FIG. 13, there is shown therein an installation wherein a plurality of panel structures 40, manifolded in the manner previously described, either as a predetermined matter at the factory or during the installation, are incorporated in a system which also embodies a roof structure, generally indicated at 110. The roof structure 110 preferably constitutes an integral part of a building in which the panel structures provide the surfaces which are exposed to the elements and hence, the manner in which the panel structures are applied to the roof structure must provide weather protection thereof. It will be understood, however, that the roof construction may consist of an existing roof structure in which the exposed area is finished with shingles or the like. Stated differently, the present invention contemplates the application of the panel structures to a roof construction 110 which is either completely finished, as with shingles, or consists of a partially completed roof construction without any shingles or appropriate comparable weather protection. As indicated, the mounting of the panel structures 40 to the roof construction 110 will provide weather protection. To this end, the installation of the panel structure 40 in accordance with the principles of the present invention, involves the initial securement of a plurality of elongated gutter strips 112 to the exposed surface of the roof construction 110 in spaced parallel relation extending longitudinally in the direction of inclination of the section of the roof construction to which the panels are to be applied. The center line spacing between adjacent strips 112 is slightly greater than the transverse dimension of the panel sections.

Each strip 112 is formed of an extrusion of plastic material as, for example, polyvinyl chloride, having a cross-sectional configuration providing a flat bottom surface 114 and an upper surface which is shaped to define a pair of longitudinally extending gutter sections 116. The outer ends of each gutter section 116 are defined by an upstanding wall section 118 which is spaced inwardly from the associated outer edge of the strip so as to provide an outer marginal fastening portion 120 at each end of the strip. Extending upwardly from the central portion of the strip is a central wall 122, the lower portion of which defines the opposite ends of the pair of gutters 116 and the upper end of which is formed with a series of downwardly and outwardly directed barb portions 124 constituting a fastening means embodied in the gutter strip.

The gutter strips 112 are fixedly secured to the exposed surface of the roof section 110 and the manner in which this securement is effected will be determined to some extent by the nature of the exposed surface of the roof construction. Where the exposed surface of the roof construction is shingles, as shown, the gutter strips 112 will be secured by elongated headed fasteners driven through the marginal end portions 120 through the shingles and into the substructure of the roof construction. Where the exposed surface of the roof construction is smooth, the gutter strips may be suitably glued thereto.

It will be noted that the strips utilized at each end of the roof are cut so that only the central wall 122 and the portion of the strip defining a single gutter with the associated end wall 118 and marginal portion 120 is utilized. In other words, the remaining part of the strip is severed as by a knife or other cutting instrumentality. In a like manner, each end portion of each central wall 122 is cut away so as to provide a space in which manifolding can extend.

It is important to note that each panel structure is installed by simply mounting the panel structure in a position between a pair of adjacent strips so that the bottom side of the panel engages the surface of the roof construction. With the embodiment shown, the peripheral side portions of each panel structure will engage an associated one of the end walls 118 of the strip. As previously indicated, since the sheet or film 92 of the base layer is of a flexible nature, this film will be deflected upwardly by the end wall thus forming a seal which prevents moisture from passing laterally therethrough. It will be noted that the end of the panel is spaced from the central wall 122 of the adjacent strip 112 a distance which is equal to approximately one-half the transverse dimension of each outer wall section 84.

Rather than to secure each panel structure to the roof construction 110 by fasteners which must extend through the panel structure or by adhesive, either of which would have the tendency to establish thermal stresses, the panel is held in a resting engagement to the roof construction by fastening means which overlies the adjacent side edge portions of the panels and cooperates with the central wall of the gutter strips 112. While such fastening means may include a series of longitudinally spaced elements, a preferred arrangement is to provide a continuous fastening strip, generally indicated at 126, for extending coextensively with each gutter strip 112.

As shown, each fastening strip 126 includes an upper wall section 128 configured to cooperate with the upper side portion surfaces of the panel structures. As shown, the upper wall section 128 has a configuration equal to three of the upper wall sections of the panel, the inner surface of which is sized to conform with the exterior surface of the panel outer wall sections. Each strip 126 also includes a pair of depending cooperating fastener walls 130 which are formed integrally with the central portion of the upper wall. The inner surfaces of the fastener walls are provided with cooperating upwardly and inwardly extending barb portions 132 of a size and shape suitable to cooperate with the barb portions 124. Here again, it will be understood that the fastening strip 126 utilized at each end of the roof section is cut so that the outermost concavo-convex wall section is removed.

It will be understood that the arrangement described is particularly desirable in that the engagement of the upper wall section 128 of the fastening strips 126 with the peripheral side portions of the panels provides a marginal securement to the panel structures which maintain them in engagement with the roof construction 110. The overlap of the fastener strip with the panel sections provides for exclusion of rain and moisture which may be driven between the overlapping wall section 128 of the strips 126 and the upper wall sections at the side portions of the panels. However, any moisture which does pass can only move downwardly into a position to be caught in the gutter section 116 of the associated gutter strip 112.

It will be understood that as successive panel structures 40 are mounted between successive pairs of gutter strips 112, the adjacent ends of the manifold pipes 96 and 104 of adjacent panel structures are interconnected in communicating relation. One preferred method of accomplishing this securement is illustrated in FIGS. 10 and 12. As shown, the securement is effected by a short section of flexible bellows tubing 134, each end of which is adapted to engage over a protruding end of manifold pipe. The connection is completed by clamping each end of the bellows tubing to the manifold pipe end as by a clamp 136 of any desired known construction.

The installation of the panels on the roof construction is completed by applying a ridge strip 138 of suitable plastic material such as polyvinyl chloride along the upper end portions of the panels. The ridge strip is secured by suitable adhesive. Similarly, a finishing strip 140 is provided along the lower exterior surface of the panels. These finishing strips 140 are like the ridge strips 138 in that they are made of plastic material and secured in position by suitable adhesive. It will be noted that the finishing strips are provided on the inclined end surfaces 108 with the lower edge of the strip being spaced at the position of the strips 112 so that the gutters 116 thereof are open to drain downwardly.

Referring now more particularly to FIG. 15, there is shown therein a schematic of a fluid flow circuit within which the assembly of the panels 70 and roof construction 110 are utilized. The circuit includes a reservoir 142 within which a large body of fluid medium, such as water, can be stored in an insulated condition, as for example, under ground. Leading from the reservoir is a suction pipe 144 which is connected to the inlet of a pump 146. Leading from the outlet of the pump 146 is a pipe 148 which is connected in parallel to three pipes, 150, 152 and 154. Pipe 152 leads to a main control valve 156 for the panel structures 70. The main control valve is connected in parallel, through pipe 158, with the inner fluid containing channel space manifold at the lower end of the panels indicated at 96 in FIG. 15. A control valve 160 is placed in the parallel line 158 at each end of the manifold 96. The parallel line 158 is also connected to each end of the manifold for the intermediate spaces of the panels and specifically the ends of the manifold tubes 104 as shown in FIG. 15. As shown, a control valve 162 is provided at each end of the manifold 104 at the lower end of the panels. A parallel return line 164 is provided which is connected with each end of the manifold tubular member 96 and 104 at the upper end of the panel structures 70. Flow from each end of the manifold tubular members 96 is controlled by valves 166 in the return line, whereas flow from the manifold tubular members 104 is controlled by valves 168 in the return line. With the circuit thusfar provided, it can be seen that pump 146 serves to move liquid from the reservoir 142 upwardly past the main control valve 146 and into parallel feed lines 158. Depending upon the type of operation desired, either valves 162 are closed and valves 160 are opened, or vice versa. Assuming that valves 160 are opened and valves 162 are closed, the liquid from the reservoir will move upwardly through the inner fluid containing channel spaces 72 of the panel structures 70 and pass outwardly therefrom through the ends of the manifold tubular member 96. Under these circumstances, the valves 166 are opened and valves 168 are closed. Fluid medium passing outwardly through the valves 166 is returned to the reservoir 142 by return line 164. The aforesaid mode represents an operation which would take place during the winter months, during the day, for purposes of heating the medium in the reservoir 142. The medium will normally be maintained at a temperature between 90°-160° F. This heated medium flows into pipe 154 which is under the control of valve 170 which communicates, through pipe 172, the liquid medium to a heat exchanger coil 174 of a room air fan unit, indicated at 176. Air blown past the coil 174 by the fan of the unit 176 is heated to maintain the room air at a desired heating level. Liquid from the coil 174 is returned to the reservoir as by a return line 178 which communicates with the main return line 164.

It will be understood that the flow of medium through the panels 70 is preferably from the bottom to the top, since this enables the flow of water to be initiated in a manner enabling the spaces 72 of the panels to be evacuated of air as the water moves upwardly therethrough. Once flow has been established, a siphon effect is maintained which diminishes the continuous load on the pump 146.

Another advantage of this arrangement is that the panel structures 70 can be drained by gravity in a simple manner. For example, as shown, there is provided a parallel line 180 which bypasses the panel structure and has a controlled drain valve 182 therein. By closing valve 156 and opening valve 182, any liquid in the panel structures 70 may be drained and returned to the reservoir 142. The opening air vent valve 209 during this time allows air to replace fluid drained to reservoir 142.

Where the panel structures 70 are to be used to dissipate heat, as for example, to cool air in the summer, valves 160 and 166 are closed and valves 162 and 168 are opened. This enables the pump 146 to move liquid medium through the intermediate fluid containing spaces 74 of the panel structures 70. This type of operation would take place during the night in the summer months, during which the fluid medium flowing through the intermediate spaces radiates outwardly through the outer air insulating spaces to the atmosphere utilizing the dark sky as a heat sink. In this way the temperature of the liquid medium within the reservoir 142 can be maintained at a temperature within the range 50°-80° F. when used in conjunction with a cooling tower assembly, generally indicated at 184. The cooling tower assembly 184 is of conventional design and includes a bottom liquid bath or pool 186 through which a chilling coil 188 extends. The inlet of the chilling coil is connected with the pipe 150 under the control of valve 190, while the outlet thereof communicates with the main return line 164 by a line 192. The assembly also includes a pump 194 which serves to draw liquid from the pool 186 and move the same upwardly to spray tubes 196 within the upper portion of the housing. The spray tubes are provided with a variable by-pass valve 198. The water discharged from the spray tubes 196 passes through a column of forced air in the housing of the assembly 186 established by fan 200 in the upper portion of the housing, the housing having air inlets 202 in the lower portion thereof. In the normal operation of the circuit, as shown, the panels 70 would be drained by closing valve 156 and opening drain valve 182 during the day. At night, drain valve 182 would be closed and main control valve 156 opened. Water from the reservoir would then be circulated through the intermediate spaces 74 of the panels 70 by pump 146, thus lowering the temperature of the water by radiant energy heat exchange through the atmosphere to black space. During such operation valve 170 is open, permitting the pump to establish flow through coil 174 within the unit 176. The fan in unit 176 thus serves to cool the air in the room. During the evening valve 190 may be closed or open as required to meet cooling loads.

The utilization of the panel 70 can be further enhanced by providing a second reservoir 211 having an internal heat exchanger 213 which would be utilized during the summer as a heat source, as for example, for a hot water system, in which the panel 70 which normally would be closed off during the day could be used in a heating mode during the summer as well. Desired circulation through heat exchanger 213 would be accomplished with valve 215 closed and valve 217 open. It would be possible also to provide for the introduction of cooling air through the valves 160 or 162, whichever is not in use, by providing for an alternative circuit thereto, as well as from either the valves 166 or 168, whichever is not in use. Such valves would then function in a manner similar to the valving 36 and 38 previously descrived in connection with the embodiment shown in FIGS. 1-4.

It will be understood that where the pitch of the roof is of sufficient angle, e.g. 5° or greater, there is a sufficient chimney effect to provide for the flow of atmospheric air through the unused manifolds and valving. In the absence of such pitch on the roof positive means must be provided for flowing a cooling fluid through the unused spaces spraying cooling water over the panels, or covering the panels with a radiation shield for the purpose of preventing damage to the panels, in the event that the flow of fluid medium through the panel is inadvertently stopped at a time when the solar conditions are such as to prevent a possible overheating.

Referring now more particularly to FIGS. 16 and 17, there is shown therein a further embodiment of the present invention which is particularly desirable when the radiant energy heat exchangers are to be utilized in heating the water of a swimming pool or the like. Under these circumstances the temperature differentials normally encountered are smaller so that the most efficient manner of operation is to pass the swimming pool water directly through the panels. Under these circumstances it is desirable to establish a maximum flow capacity with a maximum residence time within the panels.

In FIGS. 16 and 17 there is shown a radiant energy heat exchanger panel structure, generally indicated at 210, embodying the principles of the present invention. The panel structure 210 is similar to the panel structures 10 and 40 previously descirbed and closely follows the construction of the panel 70. There is provided a multiplicity of side-by-side inner fluid containing channel spaces 212, a corresponding multiplicity of intermediate fluid containing spaces 214 and a corresponding multiplicity of outer fluid containing spaces 216. The panel structure 210 is like the panel structure 70 previously described in that all of the fluid containing spaces are defined by thin wall sections formed from a single extrusion. The extrusion provides a multiplicity of barrier walls 218, each of which is defined by a pair of sheet form oppositely inclined wall sections converging outwardly of generally inverted Y-shaped configuration, rather than the inverted V of the panel 70. As before, there is provided an inner sheet form wall section 220, an intermediate sheet form wall section 222 and an outer sheet form wall section 224. Preferably, each of the wall sections 220, 222 and 224 is of concavo-convex cross-sectional configuration with the convex surface thereof facing outwardly. It will be noted, however, that the outer wall sections 222 and 224 are not of uniform thickness in cross-sectional configuration but are thicker at the middle than at the ends, so as to define a lens configuration.

Another significant difference in the panel structure 210 from the panel structure 70 resides in the provision of a bottom horizontal wall section 226 which configures the cross-section of the inner fluid containing channel spaces 212 as U-shaped, rather than V-shaped, as with the spaces 72 of the panel structure 70. The base of the panel structure 210 is similar to that of the panel structure 70 and includes glass filament bundles 228 encased within sheet or film 230.

The manifolding of the inner, intermediate and outer spaces of the panel structure 210 in order to achieve the flow characteristics previously alluded to, is shown in FIG. 17. In this instance, prior to performing any of the manifolding operations, a heatable comb-like instrument (not shown) is inserted within the upper end of the outer fluid containing spaces 216 and the heated teeth tips of the instrument are allowed to melt through the intermediate wall section 222 to form a multiplicity of vertical openings 232 at the upper end portion of the panel structure 210 which communicate the upper end portions of the outer fluid containing spaces 216 with the upper end portions of the intermediate fluid containing spaces 214. In a similar manner, openings 234 are formed in the lower end portion of the inner wall section 220 which serve to communicate the lower end portions of the intermediate fluid containing spaces 214 with the lower end portions of the inner fluid containing channel spaces 212.

Water from the swimming pool is fed to the panel structure 210 through opposite open ends of a manifold tubular member 236 similar to the tubular members 96 and 104 previously described. Thus, tubular member 236 is adapted to fit within a routed groove 238 and has a series of openings 240 therein which register interiorly with the grooved ends of the outer fluid containing spaces 216. Also, as before, the entire end of the panel structure and associated tubular member 236 are filled with foamed plastic 242.

The means provided for discharging the water from the panel may be similar, however, as shown the manifolding utilized in this instance illustrates another molding structural arrangement which embodies the principles of the present invention. As shown, the entire interior upper end portion of the panel structure is filled with foamed plastic, as indicated at 244. This operation is similar to that previously utilized in the finishing operation of the previously described manifolding. However, it is important to note that the inward travel extent of the foamed material within the ends of the spaces is not as great as the extent exteriorly thereof. With this arrangement there is provided a foamed plastic end surface 246 within each of the spaces. The manifolding is completed by drilling or otherwise cutting a throughbore 248 within the spaces to be manifolded, as for example, the inner fluid containing channel spaces 212 as shown in FIG. 17. The bore must be within the exterior foamed material but intersect the associated interior end surface thereof within the inner spaces, so as to provide manifolding communication. Suitable nipples (not shown) may be inserted in each end of the throughbore 248 instead of utilizing the clamped connections previously described. It will be understood that the manifolding bore 248 may be utilized in lieu of any of the previously described manifold tubular members 96, 104, or 236, or vice versa.

Still further panel construction variations embodying the principles of the present invention are illustrated in FIGS. 18-24. In FIG. 18 there is shown a radiant energy heat exchanger panel structure, generally indicated at 250 which is similar to the panel structures 10, 70 and 210 previously described and closely follows the construction of the panel 40. There is provided a multiplicity of side-by-side inner fluid containing channel spaces 252, a corresponding multiplicity of intermediate fluid containing spaces 254 and a corresponding multiplicity of outer fluid containing spaces 256. The panel structure 250 is like the panel structure 40 previously described except that all of the fluid containing spaces are defined by thin wall sections formed from a single extrusion. The extrusion provides a multiplicity of barrier walls 258, each of which is defined by a pair of sheet form oppositely inclined wall sections converging outwardly of generally inverted Y-shaped configuration, rather than the inverted V of the panel 40. As before, there is provided an inner sheet form wall section 260, an intermediate sheet form wall section 262 and an outer sheet form wall section 264.

As shown, the wall sections 260, 262 and 264 are of uniform thickness in cross-section, and each is of generally concavo-convex curvature. It is important to note that the outer sheet wall section 264 has its convex surface facing outwardly or upwardly while the convex surface of the intermediate wall section 262 faces inwardly or downwardly. Moreover, these two sheet form wall sections are interconnected along their ends so that each outer space 256 defined by the concave interior surface of each outer wall section 264 and the concave interior surface of the associated intermediate wall section 262 has a cross-sectional configuration of an equiconvex positive lens. Thus, to enhance the lens effect provided by the wall sections 264 and 262, it is preferred to flow water in the outer spaces 256. The flow of such water may be provided by a separate circuit or it may come from the liquid medium flowing through the inner spaces 252.

FIG. 18 also serves to illustrate a base insulating sub-assembly, generally indicated at 266. As shown, the sub-assembly includes a layer of crimped aluminum foil 268 having one surface coated with a black pigmentation or the like. In the drawings the crimp of the aluminum foil is exaggerated, and it will be noted that the foil is further formed into a series of parallel V's so as to conform to the lower exterior surface of the barrier walls 258. The black coated surface of the aluminum foil 268 faces the walls 258 while the other surface of the foil is maintained as a bright metallic color. Filling the inverted V spaces defined by the crimped aluminum foil 268 is a fiber glass filler 270. This fiber glass filler is preferably blown onto the panel when in inverted relation. The fiber glass filler 270 is retained in position by a flat bright aluminum foil 272 which is bonded by hot melt spray dabs. The crimped aluminum foil 268 likewise may be bonded to the walls 258 by the utilization of hot melt dabs or other adhesive material.

In those applications where additional insulation would be desirable a layer of foamed urethane 274 is applied to the flat aluminum foil 272 and, for long shelf life, the lower surface of this layer may be coated with a latex coating 276. It will be understood that with the base sub-assembly 266, the sheet form walls 258 and wall sections 260, 262 and 264 can be formed of materials of the type which facilitate the passage of radiant energy therethrough as, for example, polycarbonate. The black coated surface of the crimped aluminum foil 268 serves to retard the passage of radiant energy through the base. If desired, the crimped configuration of the foil may be dispensed with and the foil with black coating can be surface adhered to the exterior surfaces of the walls 258. It will be understood that the panel structure 250 shown in FIG. 18 can be manifolded in the manner previously described.

In FIG. 19 there is shown a panel extrusion 280 illustrating a particularly desirable variation in the construction of the outer wall sections. The panel extrusion 280 provides a multiplicity of side-by-side inner fluid containing channel spaces 282, a corresponding multiplicity of intermediate fluid containing spaces 284 and a corresponding multiplicity of outer fluid containing spaces 286. In this case the extrusion provides a multiplicity of barrier walls 288 each of which is defined by a pair of sheet form oppositely inclined wall sections converging outwardly of generally inverted V-shaped configurations. It will be noted, however, that the V-shaped wall sections are interconnected at their inner or lower ends in a smooth arcuate transition so as to define the lower portion of the inner spaces 282 generally in a semi-cylindrical shape. The extrusion 280 also includes the inner wall sections 290 which are of arcuate configuration and serve to define the upper portion of the inner spaces 282 as a complete circular space in cross-section. Intermediate wall sections 292 are provided which, as shown, are straight and of uniform wall thickness throughout.

The panel extrusion 280 also includes a multiplicity of outer wall sections 294, each of which is shown as having a cross-sectional configuration in the form of a positive meniscus lens. The curvature of the outer surface of the wall section 294 is chosen to provide optimum radiation transmission of the panel depending upon the location of use. For example, the cross-section of the outer surface of the outer wall section 294 may be a complete semi-circle where the panel is to be utilized in northern regions. On the other hand, where the panel is to be used near the equator, a much shallower arcuate configuration is more desirable. The arrangement is such that the morning and evening solar radiations will be transmitted to the inner surfaces by a combination of refraction and reflection through the outer wall sections which maximizes the daily radiation transmission. Representative radiation lines designated by the numeral 296 indicating morning and evening conditions are illustrated in the drawings. Representative lines 298 indicating lines of radiation during the hours 9 to 10 and 2 to 3 are likewise shown as are radiation lines 300 indicating the condition at high noon.

Lenses combining total internal reflection for early morning and late afternoon suns with concentrating refraction for mid-morning to mid-afternoon suns approach the efficiency of specularly reflecting V walls. The major advantage is that the simple lenses are formed by continuous extrusion saving the cost of applying specular reflector coatings to the V walls. Concentration ratios are more limited than Fresnel lenses and exterior anti-reflection coatings are probably required for best performance.

FIGS. 20 and 21 illustrate two further variations on the panel configuration shown in FIG. 19. In these two figures the panel extrusion is the same and hence both are designated by the common reference numeral 310. As before the panel extrusion 310 provides a multiplicity of inner fluid containing channel spaces 312, corresponding multiplicity of intermediate fluid containing spaces 314 and a corresponding multiplicity of outer fluid containing spaces 316. The barrier walls 318 provided in these two constructions is similar to the barrier wall 288 except that the lower semi-circular interconnection between the wall sections is enlarged so that there are provided inner insulating spaces 320 between the V-shaped wall sections and the adjacent arcuate wall sections. Also as before, there is provided inner wall sections 322, intermediate wall sections 324 and outer wall sections 326. Outer wall sections 326 are shown in a configuration similar to the outer wall sections 294 except that the arcuate configuration is more shallow. Intermediate wall section 326 is of positive meniscus configuration in cross-section rather than straight as is illustrated by the wall section 292. The construction of FIGS. 20 and 21 is particularly desirable when the extrusion is used without the provision of an insulating sub-assembly in the base.

FIG. 20 illustrates a system for coating the inner interior surface of the inner channel spaces 312 to achieve increased efficiency and radiation control. As shown in FIG. 20, incident solar radiation at 100% to the upper lens wall sections 326 is transmitted by refraction with a 10 to 20% loss by first surface scatter, conversion to heat, and further scatter upon passage through the second surface. Similar losses occur at the second lens wall sections 324 where additional refraction bends the light. Radiation delivered to the inner channel 312 may accordingly be as low as 50% of the incident available radiation at operation towards the end of the useful life of the system and 70% or higher towards the beginning of the application. Radiation passing through water-based working fluids within the inner channel spaces 312 is attenuated 20 to 30% by direct absorption and conversion to heat. Radiation passing through the working fluid may reach a coating 328 on the lower wall sections of the barrier walls of inner surface 300 which functions as an opaque target. Radiation absorbed by coating target 328 is converted to heat and is reradiated back into inner channel 312 at wavelengths within the long infrared spectra which are very efficiently absorbed by water-based working fluids. Major heat addition from the 50 to 70% available solar energy entering the inner channel spaces occurs near coating 328 due to the high efficiencies at infrared wavelengths available.

Application of coating 328 is preferably accomplished by flooding the inner channel spaces 312 with suitable vehicles carrying desired pigments. Vehicles especially appropriate for polycarbonate plastic embodiments of the invention include clear latex, siloxanes, and waxes. Pigments suitable for coating 328 include selective and non-selective fillers such as carbon black, iron oxide, manganese oxide, aluminum oxide, tin oxide, zinc oxide, and numerous organic colorants. Direct flooding of the selected coating system slightly below and up to the inner wall section 322 are suitable and allow for considerable tolerance during manufacturing. Flooding followed by immediate drainout and forced air or infrared-accelerated drying allows rapid coating applications. As illustrated, the combination of lens refraction and coating of selected surfaces of inner channel 312 results in considerable coating cost savings compared to conventional extended surface collectors.

FIG. 21 illustrates a version of the invention particularly adapted to heating non-aqueous working fluids such as nitrogen, carbon dioxide, argon, helium, or air. In operation, solar energy passing through outer lens wall sections 326, intermediate lens wall sections 324, and inner wall sections 322 into inner channel spaces 312 is converted to heat by high surface-to-volume filler material 330. Application of filler 330 may be similar to coating 328 as it involves the flooding of inner channel 312 with a suitable adhesive such as the vehicles mentioned in conjunction with coating 328. Filler 330 consisting of fibers or particles having high surface-to-volume ratio, however, is preferably achieved by blowing such materials into channel 312 during forced drying of adhesive vehicles. Suitable high surface-to-volume fibers include whiskers and threads of aluminum, graphite, and stainless steel. Surface conversion coatings well-known in the optics literature are useful for increasing the prompt conversion of radiation to heat on the surface of such materials. Suitable high surface-to-volume particles include aluminum, graphite, stainless steel, and a number of other alloys having sufficient corrosion resistance to withstand the chemical activity of the selected working fluids.

FIG. 22 illustrates a variation which, like the variation illustrated in FIG. 21, is particularly suited to applications where the heat transfer medium is a gas. The embodiment of FIG. 22 has features similar to those embodied in the panel constructions 70, 250 and 280. As shown, the embodiment of FIG. 22 consists of a panel structure, generally indicated at 340, which includes a multiplicity of inner fluid containing channel spaces 342, a corresponding multiplicity of intermediate fluid containing spaces 344 and a corresponding multiplicity of outer fluid containing spaces 346. Barrier walls 348 are provided which have a configuration generally the composite of that embodied in panel constructions 250 and 280. Thus, the barrier walls 348 include straight upper wall sections which serve as a common dividing wall between adjacent outer fluid containing spaces 34, downwardly diverging intermediate wall sections defining sides of adjacent intermediate spaces 344 and lower arcuate wall sections defining the lower portion of the inner spaces 342 in a semi-cylindrical cross-sectional configuration.

The panel construction 340 also includes inner wall sections 350, intermediate wall sections 352 and outer wall sections 354. As shown, the outer wall sections 354 are formed with interior Fresnel lens configurations in the manner indicated above with respect to panel construction 70. The intermediate wall sections 352 are, as shown, of concavo-convex cross-sectional configuration with uniform wall thickness. The convex surface faces outwardly or upwardly. Inner wall sections 350 are of arcuate configuration so that the total cross-sectional configuration of the inner spaces 342 is circular.

Disposed within the inner spaces 342 is a multiplicity of helical aluminum targets 356. It is preferable to utilize the bright metallic color of the surfaces of the aluminum foil helical targets. This is because light reflecting from the helical planes tends to be reflected many times back and forth before an escape back in the direction of the sky can be effected. On each reflective path 10 or 15% of the effective radiant energy is lost and by the time an escape path is taken considerable attenuation has occurred for new rays that entered the spaces 342. Moreover, the mean temperature of the aluminum of the targets 356 may considerably exceed that of the plastic of the extrusion which defines the spaces 342 within which the aluminum targets 356 are mounted. Providing the helical targets 356 with high reflective surfaces (low emissivity) therefore minimizes heat loss by radiation through spaces 344 and 346 and intermediate wall sections 352 and 354.

FIG. 23 illustrates a variation which is particularly desirable from a standpoint of enabling the utilization of materials of minimum cost. As shown, the configuration is similar to the configuration embodied in panel 310 insofar as the construction of the barrier walls is concerned. With reference to FIG. 23 the panel extrusion shown therein is generally indicated by the reference numeral 360. As before, the panel provides a multiplicity of inner fluid containing channel spaces 362, a corresponding multiplicity of intermediate fluid containing spaces 364 and a corresponding multiplicity of outer fluid containing spaces 366. As previously indicated, barrier walls are configured similar to those embodied in the panel construction 310, thus the barrier walls include upper wall sections 368 which converge upwardly and are of generally inverted V-shaped configuration in cross-section and lower wall sections 370 of arcuate configuration in cross-section. Each arcuate wall section 370 has an arcuate extent greater than 180° and extends from the lower end of one of the legs of the V-shaped wall sections to the lower end of the other leg of the adjacent V-shaped wall section.

Also, as in the construction shown in FIG. 20, the arcuate wall sections associated with adjacent inner spaces are integrally interconnected so as to define insulating spaces 372. The panel construction 360 differs from the panel 310 in that each arcuate wall section 370 is formed with three circumferentially spaced radially inwardly extending integral wall sections 374. The inner ends of these wall sections are spaced apart so as to engage the exterior periphery of a tubular element 376. The tubular element 376 is a separately provided member which preferably is formed of a material such as polysulfone or polyfluorocarbon, capable of withstanding temperatures up to 500° F. whereas the remainder of the panel is formed of polycarbonate or polypropylene. In the construction of the panel 360 the remainder of the panel shown in FIG. 23 is extruded around the tubular elements 376.

It will be noted that the tubular elements 376 define the inner fluid containing channel spaces 362 with a circular cross-sectional configuration. The lower portions of the tubular elements 362 constitute a portion of the barrier walls while the upper portions thereof define the innerwall sections which serve to divide the inner spaces 362 from the intermediate spaces 364. Intermediate spaces 364 are additionally divided by the adjacent radial wall sections 374, adjacent portions of the arcuate wall sections 370 and intermediate wall sections 378. The intermediate wall sections 378, as shown, are of concavo-convex arcuate configuration and form a continuation of the arcuate wall sections 370. The panel construction 360 also includes outer wall sections 380. The wall sections 380 have a cross-sectional configuration in the form of plano-convex positive lens.

It will also be noted that insulating spaces 382 and 384 are provided between the interior surfaces of the arcuate lower wall sections 370, the exterior surfaces of the tubular element 376, and the radial wall sections 374. These spaces, like the spaces 372, are generally regarded to be insulating spaces although it will be understood that they are capable of containing fluid and sustaining a flow of fluid therethrough.

FIG. 24 shows a variation of the panel illustrated in FIG. 23. In this embodiment, which is generally indicated by the reference numeral 390, there is likewise included a multiplicity of inner spaces 392, a corresponding multiplicity of intermediate spaces 394 and a multiplicity of outer spaces 396. In this embodiment barrier walls 398 are provided which are in the form of inverted V-shaped cross-sectional configuration. It is noted that the lower portions of the barrier walls are turned inwardly as indicated at 400.

In this case, the inner spaces 392 are defined by separate tubular elements 402 in a manner similar to the elements 376 previously described. The remainder of the panel which is made of a single extrusion includes intermediate wall sections 404 and outer wall sections 406. With this construction, the tubular elements 42 may be inserted after the extrusion of the remainder of the panel shown although it is within the contemplation of the invention to provide the extrusion around the tubular elements 402 in the manner similar to the embodiment shown in FIG. 23. In any event, the lower portion of the tubular elements 402 forms a part of the barrier walls and the upper portions provide the inner wall sections which serve to divide the inner spaces 392 from the intermediate spaces 394.

In the embodiment shown, intermediate wall sections 404 are provided with a cross-sectional configuration of an equi-convex positive lens. The outer wall sections 406 are similar to the outer wall sections 380 and are in the cross-sectional form of a plano-convex positive lens.

From the above it can be seen that all of the objectives of the present invention are obtained by the panel structures 10, 40, 70 and 210 of the present invention. Particularly the panel structure 70 is provided to optimize the efficient collection of radiant energy from the sun and efficient rejection of unwanted heat to space while utilizing economical materials, such as the plastics described, rather than expensive metals such as copper and the like which are inherently capable of withstanding such higher temperatures. It is of significance to consider the solar energy collection efficiency which can be secured by following the principles of the present invention.

From the first law of thermodynamics come the mathematical concepts governing solar energy conversion. Most flat plate collectors have no work-performing or delivering functions; thus radiant energy incident to the collection surfaces times the efficiency of collection conversion yields an amount of heat energy, $Q_{FP1}$.

$$Q_{FP1} = (Q_r)(\alpha) \qquad \text{Equation 1.0}$$

$(Q_r)(\alpha)$ represents the radiant energy $Q_r$ times the solar absorptivity $\alpha$. The solar absorptivity has a maximum value of 1, and ranges from nearly 0 for polished metals to about 1 for carbon black or holes.

$Q_r$ may be further analyzed as an amount of radiant energy transferred from a body of temperature T.

If the emitting body is a black body and the temperature is in absolute degrees, $Q_r$ equals $$Q_r = \delta A T^4 \qquad \text{Equation 1.2}$$

In this equation, A is the effective radiating area and $\delta$ is the Stefan-Boltzmann constant, $0.174 \, (10^{-8})$ BTU/hr. ft.$^2$ R$^4$. For all other emitters having emissivity E less than 1, $$Q_r = \delta A E T^4 \qquad \text{Equation 1.3}$$

Thus by substitution into equation (1.0), the energy received by the flat plate collector is:

$$Q_{FP1} = \delta A E \alpha T^4$$

The collector is also a radiator and emits energy back to the sun and to every other body it sees. The difference between the energy received by the flat plate collector and the energy emitted by the collector is available to heat the working fluid, providing the heat is not lost by conduction, convection, transpiration, and infiltration to and from surrounding atmospheres. The heat loss by radiation away from the collector is $$Q_{FP2} = \delta A_2 E_2 T_2^4 \qquad \text{Equation 1.4}$$

$T_2$ is the absolute temperature of the collector, $E_2$ is the collector emissivity, and $A_2$ is the collector area. Thus the net heat gain by radiative transfer for black bodies is $$Q_{net} = Q_{FP1} - Q_{FP2} = \delta A_{1,2}(T_1^4 - T_2^4) \qquad \text{Equation 1.5}$$

Where $A_{1,2}$ is a configuration or view factor based upon the areas $A_1$ and $A_2$ and geometrical relationships between them.

$Q_{net}$ for radiative exchange between non-black bodies may be found by measurement of real emissivities E and absorptivities $\alpha$. Thus for two bodies, $$Q_{net} = \delta(A_1 E_1 \alpha_2 T_1^4 - A_2 \alpha_1 E_2 T_2^4) \qquad \text{Equation 1.6}$$

This equation is often simplified by assuming that monochromatic emittance and absorptance are equal and that for radiation between objects $A_1$ and $A_2$ may be replaced by an effective "A".

$$Q_{net} = \delta A E(T_1^4 - T_2^4) \qquad \text{Equation 1.7}$$

The surroundings tend to have an infinite number of other bodies for energy exchange with the flat plate collector, however, two extreme cases govern practical performance. Exchange with the sun is the first important case because it tends to be the highest possible temperature source at T = 10,000° R. The other important exchange is with the sky or space surrounding the sun because this tends to be the lowest possible temperature sink at near absolute zero, T = 0° R.

It is important to note that the strength or intensity of energy exchange by radiation is most affected by temperature, T, which appears in our transfer equations as a factor to the fourth power. Relatively small temperature differences in various portions of the panel can result in significant radiation transfer effects.

For example, in practice the outer wall sections of the panel structure, as for example outer wall section 84, tends to assume the temperature of the ambient (temperature $T_A$) and the inner portion of the barrier walls 78 defining the inner spaces 72 tend to assume the temperature of the fluid medium (temperature $T_F$). Other temperatures are functions of the material properties and geometrical relationships. The outer and intermediate spaces 76 and 74 play the role of providing an upper insulative transparent, non-infiltrating, medium of non-convective stratified air.

By measuring the temperatures along barrier walls 78 and wall sections 80 and 82 for different $T_A$ and $T_F$ conditions, as a function of different spacings in 76 and 74, upper glazing optimization may be achieved. Simply increasing the spacings in 76 and 74 is not desired as heat losses by convective circulation of air actually increase, for some panel application orientations, over certain threshold spacing values. Decreasing the spacing conserves material but must be optimized according to geometrical and material interface functions including surface finish, surface tension, and thermal diffusivity in bulk and surface layers.

Similarly, measuring the temperature along barrier walls 78 as a function of different colors and reflectivities of their associated surfaces allows optimization of matters relating to optical functions of opaque elements of the panel. Measurement of these temperatures with various "dark side" insulation candidates offers still another area of optimization.

Classical collector configurations having copper or aluminum sheet targets transferring heat to soldered or embossed tube channels have tended to designs reflecting concern about optimum flow efficiency. This is because the metal targets are opaque and the working fluids are only heated by conduction from first heated metal target materials. Low fluid flow rates produce rapid fluid temperature rises, and after short distances of travel through the panel no further heat can be collected because fluid temperatures approach metal temperatures making efficiencies approach zero. Heat transfer by conduction, $Q_c$:

$$Q_c = AU(T_1 - T_2) \qquad \text{Equation 1.8}$$

is a function of the area exposed to a temperature drop $(T_1-T_2)$ times an overall heat transfer factor U.

As $(T_1-T_2)$ approaches zero, $Q_c$ approaches zero. High fluid flow rates in classical panels produce more or less uniform metal target temperatures $T_1$ and working fluid temperatures $T_2$ at all sections of the panel. Local temperature gradients must always exist for any heat to be transferred but at high flow rates, the temperature of the target plate can be found to be about the same near the fluid entrance point as that near the fluid exit point. Fluid flowing through classical collector tubes cool the tubes and establish thermal gradients through the solder and fin tied to it. Thus it is desired that the tube, solder, and fin target operate at higher temperatures than the fluid temperatures although it is recognized that more back radiation, convective, and conductive losses to the atmosphere will result.

Another useful approach developed by classic flat plate collector designers has to do with measuring collector efficiency by calorimetry techniques. The working fluid temperature is measured on entry and exit from the collector, the mass flow rate is determined, and a net head addition is calculated for available collector area, $$q = \frac{MCp(T_1 - T_2)}{A} \qquad \text{Equation: 2.0}$$

Where q is the heat added per square measure of area per unit of time, M is the mass flow rate, Cp is the specific heat of the working fluid, and A is the available collector area.

Dividing 2.0 by the available solar energy gives the overall efficiency;

$$E = q/H \qquad \text{Equation 2.1}$$

where H is the solar intensity in BTU/ft$^2$ and q is the converted BTU/ft$^2$ hr or heat in other units equivalent to H.

Important qualifications, to make calculations by Equation 2.1 meaningful, include the ambient temperature, the wind velocity, the humidity, panel inclination with respect to the incoming sunlight, direct vs diffuse radiation, complete descriptions of the panel and working fluid, and of course complete information on the instrumentation and procedures used. It is entirely possible for a poorly insulated panel to exceed 100% efficiency when tested at ambients higher than the inlet working fluid temperature. Transpiring panels which would ordinarily produce poor overall efficiency as measured by equation 2.1 could do quite well when tested at 100% relative humidity conditions. Higher working fluid inlet temperatures tend to increase losses to the environment, (although equation 2.1 will work perfectly well with any $\Delta T$,) and illustrates the need to report inlet and outlet temperatures rather than a temperature increase.

Further, the importance of reporting collector geometry should not be overlooked. The following table illustrates why.

| SOLAR ENERGY DISTRIBUTION THROUGH DIFFERENT WATER LENGTHS | | | | | | | | | | | |
|---|---|---|---|---|---|---|---|---|---|---|---|
| Wave Length (microns) | | % less than $\gamma_2$ | Length of Passage through Water | | | | | | | | |
| $\gamma_1$ | $\gamma_2$ | | 0 | 0.0004" | 0.004" | 0.04" | 0.40" | 4.0" | 40" | 400" | 4000" |
| 0.2 to 0.6 | | 23.7 | 23.7 | 23.7 | 23.7 | 23.7 | 23.7 | 23.6 | 22.9 | 17.2 | 1.4 |
| 0.6 to 0.9 | | 59.7 | 36.0 | 36.0 | 36.0 | 35.9 | 35.3 | 30.5 | 12.9 | 0.9 | — |
| 0.9 to 1.2 | | 77.6 | 17.9 | 17.9 | 17.8 | 17.2 | 12.3 | 0.8 | — | — | — |
| 1.2 to 1.5 | | 86.3 | 8.7 | 8.6 | 8.2 | 6.3 | 1.7 | — | — | — | — |
| 1.5 to 1.8 | | 94.3 | 8.0 | 7.8 | 6.4 | 2.7 | — | — | — | — | — |
| 1.8 to 2.1 | | 96.8 | 2.5 | 2.3 | 1.1 | — | — | — | — | — | — |
| 2.1 to 2.4 | | 99.3 | 2.5 | 2.4 | 1.9 | 0.1 | — | — | — | — | — |
| 2.4 to 2.7 | | 99.9 | 0.7 | 0.6 | 0.2 | — | — | — | — | — | — |
| 2.7 to 3.0 | | 100% | 0.04 | .02 | — | — | — | — | — | — | — |
| % of total | | | 100% | 99.37 | 95.21 | 85.94 | 73.02 | 54.93 | 35.81 | 18.15 | 1.39 |

The present panel preferably provides direct exposure of the fluid being heated to the heat source. Water sees the sun. Primary radiative transfer is the major means of energy conversion. Conduction from a fin is secondary. The table shows that the U.V. and visible spectrum from 0.39 to 0.75 microns gets through pure water quite well. About 27% of the available energy including all wavelengths longer than 1.8 microns, however, is absorbed by water 0.4" thick. Notably, almost 15% of the available energy including all wavelengths longer than 2.1 microns is absorbed by only 0.04" of water. For a pure water heater, geometrics having deep water channels and side walls which are highly reflective to increase the effective path length are important.

Increasing the 0.2 to 1.8 micron absorptivity in water based working fluids is relatively simple. Modern ink, plastic film, and paint compounders are quite familiar with pigmentation and optical filtration systems which will absorb all or only part of the spectrum of interest. Ink compounders tend toward solutions designed to function under drying and capilary control restraints much more requiring than ours but resistance to U.V. degradation is sometimes a problem for maintenance of the fragile hews produced.

From Wein's law, equation 2.2, the peak energy wavelength $\lambda_{max}$ for the solar spectrum is $$\lambda_{max} = \frac{2898}{T^\circ K} \frac{5216}{T^\circ R} = .48 \text{ microns} \qquad \text{Equation 2.2}$$

and about 25% of the available energy is at wavelengths shorter than $\lambda_{max}$ and 75% is at wavelengths longer than $\lambda_{max}$. Inexpensive material selections for extrusion and recycling purposes (if not radiative cooling purposes) tend to require U.V. stabilizers to achieve useful service lines.

The solar $\lambda_{max}$ value of 0.48 microns approximately corresponds to the color human eyes normally best respond or respond to least energy levels. Actually the eye has two types of retinal responders, rods and cones, and is adaptable to low light levels or relatively high light levels. Each extreme in light level sensitivity has slightly different maximum response wavelengths.

Cone vision, also called photopic eye response, favors field luminance greater than 3 candles per meter$^2$ and peaks at wavelengths of about 0.55 microns which we call yellow green. Rod vision, also known as scotopic eye response favors field luminance less than about $3 \times 10^{-5}$ candles per meter$^2$ and peaks about 0.51 microns which we call blue green.

Surface tinting the transparent glazings with U.V. (0.2 micron up to visible violet 0.39) reflective pigments would reduce the available energy within lower segments to about 85% to 95% of incident direct radiation. Absorbing the U.V. in the outer layer would provide some heat generation in the outer layer. Heat generated by absorption in the outer layer would be radiated toward the surroundings including interior portions of the collector. Under stagnant outside air conditions this could add a small input of I.R. to the fluid channel, however, the losses to moving air outside the panel are generally large and defeat any dependancy upon this mode of operation.

Pigmenting water based working fluids to achieve reduced light extinction distances and selective behavior is more promising. Decorative hews can easily be developed.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A radiant energy heat exchanger comprising:
   a panel structure having sides of substantial area bounded by a thin periphery including opposed peripheral end portions, one of said sides being operable to face in a direction to receive radiant energy with the other side facing in opposed relation to said operable side, said panel structure including
   a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure,
   an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure,
   an outer sheet form wall section sealingly connected with each pair of adjacent barrier walls at positions along the outer portions thereof and extending transversely across the associated pair of adjacent barrier walls outwardly of the associated inner wall section and longitudinally between the end portions of said panel structure, the exterior surfaces of said outer wall sections defining coextensive areas of the operable side of said panel structure,
   means including said outer and inner wall sections defining a multiplicity of outer fluid containing spaces extending longitudinally between the end portions of said panel structure in outwardly disposed relation with respect to said multiplicity of inner fluid containing channel spaces.
   said sheet form wall sections being constructed to facilitate the passage of radiant energy inwardly therethrough,
   said base being constructed to retard the passage of radiant energy therethrough,
   means for directing a flow of fluid through said inner fluid containing channel spaces from a position adjacent one end portion of said panel structure to a position adjacent the other end portion of said panel structure so that during the flow of said fluid radiant energy will be received thereby only after such radiant energy passes inwardly through said sheet form wall sections and said outer fluid containing spaces, and
   selectively operable means for admitting a cooling fluid into the portions of said outer fluid containing spaces defined by said inner wall sections at a position adjacent one end portion of said panel structure and for allowing said cooling fluid to flow through said portions of said outer fluid containing spaces and outwardly thereof at a position adjacent the other end portion of said panel structure whereby overheating of said panel structure can be prevented in the event that the flow of fluid through said inner fluid containing channel spaces is stopped during a period in which said panel structure is receiving radiant energy of an intensity sufficient to effect such overheating.

2. A radiant energy heat exchanger comprising:
   a panel structure having sides of substantial area bounded by a thin periphery including opposed peripheral end portions, one of said sides being operable to face in a direction to receive radiant energy with the other side facing in opposed relation to said operable side, said panel structure including
   a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure,
   an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure, an outer sheet form wall section sealingly connected with each pair of adjacent barrier walls at positions along the outer portions thereof and extending transversely across the associated pair of adjacent barrier walls outwardly of the associated inner wall section and longitudinally between the end portions of said panel structure, the exterior surfaces of said outer wall sections defining coextensive areas of the operable side of said panel structure, and means including said outer and inner wall sections defining a multiplicity of outer fluid containing spaces extending longitudinally between the end portions of said panel structure in outwardly disposed relation with respect to said multiplicity of inner fluid containing channel spaces, said sheet form wall sections being constructed to facilitate the passage of radiant energy inwardly therethrough, said base being constructed to retard the passage of radiant energy therethrough, each of said barrier walls being formed by a pair of sheet form oppositely inclined wall sections converging outwardly to define one of the aforesaid outer portions, the arrangement being such that said panel structure can be displaced from a collapsed storage and transporting condition wherein the inner edges of each pair of inclined wall sections are disposed in a relative adjacent relationship with respect to one another into an operative condition wherein (1) the inner edges of each pair of inclined wall sections are spaced laterally apart a distance greater than the relative adjacent relationship of said collapsed condition and (2) a flow of fluid can be directed through said inner fluid containing channel spaces from a position adjacent one end portion of said panel structure to a position adjacent the other end portion of said panel structure so that during the flow of said fluid radiant energy will be received thereby only after such radiant energy passes inwardly through said sheet form wall sections and said outer fluid containing spaces.

3. A radiant energy heat exchanger as defined in claim 2 wherein the inner edges of each pair of inclined wall sections are interconnected by a wall section having a central fold movable in a direction toward the outer edge of the associated pair of inclined wall sections.

4. A radiant energy heat exchanger as defined in claim 2 wherein each of said outer sheet form wall sections is of concavo-convex cross-sectional configuration with the convex surface thereof facing outwardly so as to (1) provide a multiplicity of side-by-side arches on the operable side of said panel structure which serve to enhance the load bearing capabilities thereof; (2) provide a multiplicity of side-by-side convex surfaces on the operable side of said panel structure which serve to enhance the range of the angle of incidence of radiant energy passable therethrough; and (3) provide a multiplicity of side-by-side lenses on the operable side of said panel structure which serve to concentrate the radiant energy passing therethrough.

5. A radiant energy heat exchanger comprising:

a panel structure having sides of substantial area bounded by a thin periphery including opposed peripheral end portions, one of said sides being operable to face in a direction to receive radiant energy with the other side facing in opposed relation to said operable side, said panel structure including a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure, an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure, an outer sheet form wall section sealingly connected with each pair of adjacent barrier walls at positions along the outer portions thereof and extending transversely across the associated pair of adjacent barrier walls outwardly of the associated inner wall section and longitudinally between the end portions of said panel structure, the exterior surfaces of said outer wall sections defining coextensive areas of the operable side of said panel structure, each of said outer sheet form wall sections being of concavo-convex cross-sectional configuration with the convex surface thereof facing outwardly so as to (1) provide a multiplicity of side-by-side arches on the operable side of said panel structure which serve to enhance the load bearing capabilities thereof; (2) provide a multiplicity of side-by-side convex surfaces on the operable side of said panel structure which serve to enhance the range of the angle of incidence of radiant energy passable therethrough; and (3) provide a multiplicity of side-by-side lenses on the operable side of said panel structure which serve to concentrate the radiant energy passing therethrough, means including said outer and inner wall sections defining a multiplicity of outer fluid containing spaces extending longitudinally between the end portions of said panel structure in outwardly disposed relation with respect to said multiplicity of inner fluid containing channel spaces, said sheet form wall sections being constructed to facilitate the passage of radiant energy inwardly therethrough so that a flow of fluid directed through said inner fluid containing channel spaces from a position adjacent one end portion of said panel structure to a position adjacent the other end portion of said panel structure will result in radiant energy being received by the fluid flow only after such radiant energy passes inwardly through said sheet form wall sections and said outer fluid containing spaces, said base being constructed to retard the passage of radiant energy therethrough.

6. A radiant energy heat exchanger as defined in claim 5 wherein each of said outer wall sections is of concavo-convex cross-sectional configuration with the convex surface thereof facing outwardly, the wall thickness of each outer wall section being greater in the center than the ends thereof so as to define the cross-sectional shape of a positive meniscus lens.

7. A radiant energy heat exchanger as defined in claim 5 wherein said barrier walls include lower wall sections each defining the inner portion of an inner channel space and having an arcuate cross-sectional configuration, each of said inner wall sections being of arcuate cross-sectional configuration and forming with an associated lower wall section a generally cylindrical wall cross-sectional configuration.

8. A radiant energy heat exchanger as defined in claim 7 wherein said barrier walls include upper wall sections converging upwardly from the adjacent ends of adjacent lower wall sections.

9. A radiant energy heat exchanger as defined in claim 8 wherein the inner wall sections of arcuate cross-sectional configuration have an arcuate extent less than 180°.

10. A radiant energy heat exchanger as defined in claim 5 wherein each of said outer wall sections in cross-section is in the shape of a plano-convex positive lens.

11. A radiant energy heat exchanger comprising:
a panel structure having sides of substantial area bounded by a thin periphery including opposed peripheral end portions, one of said sides being operable to face in a direction to receive radiant energy with the other side facing in opposed relation to said operable side, said panel structure including
a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure,
an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure,
an outer sheet form wall section sealingly connected with each pair of adjacent barrier walls at positions along the outer portions thereof and extending transversely across the associated pair of adjacent barrier walls outwardly of the associated inner wall and section longitudinally between the end portions of said panel structure, the exterior surfaces of said outer wall sections defining coextensive areas of the operable side of said panel structure,
an intermediate sheet form wall section sealingly connected with each pair of adjacent barrier walls at positions along the outer portions thereof and extending across the associated pair of adjacent barrier walls between the associated inner and outer wall sections and longitudinally between the end portions of said panel structure so as to define a multiplicity of outer and intermediate fluid containing spaces in outwardly disposed relation with respect to said multiplicity of inner fluid containing channel spaces,
said sheet form wall sections being constructed to facilitate the passage of radiant energy inwardly therethrough so that a flow of fluid directed through said inner fluid containing channel spaces from a position adjacent one end portion of said panel structure to a position adjacent the other end portion of said panel structure will result in radiant energy being received by the fluid flow only after such radiant energy passes inwardly through said sheet form wall sections and said outer fluid containing spaces,
said base being constructed to retard the passage of radiant energy therethrough.

12. A radiant energy heat exchanger as defined in claim 11 wherein each of said outer sheet form wall sections is of concavo-convex cross-sectional configuration with the convex surface thereof facing outwardly so as to (1) provide a multiplicity of side-by-side arches on the operable side of said panel structure which serve to enhance the load bearing capabilities thereof; (2) provide a multiplicity of side-by-side convex surfaces on the operable side of said panel structure which serve to enhance the range of the angle of incidence of radiant energy passable therethrough; and (3) provide a multiplicity of side-by-side lenses on the operable side of said panel structure which serve to concentrate the radiant energy passing therethrough.

13. A radiant energy heat exchanger as defined in claim 12 wherein each of said barrier walls is formed by a pair of sheet form oppositely inclined wall sections converging outwardly to define one of the aforesaid outer edges, the arrangement being such that said panel structure can be displaced from an operative condition wherein the inner edges of each pair of inclined wall sections are spaced laterally apart a predetermined distance and a collapsed condition wherein the inner edges of each pair of inclined wall sections are disposed closer together than said predetermined distance.

14. A radiant energy heat exchanger as defined in claim 13 wherein the inner edges of each pair of inclined wall sections are interconnected by a wall section having a central fold movable in a direction toward the outer edge of the associated pair of inclined wall sections.

15. A radiant energy heat exchanger as defined in claim 11 wherein manifold means is provided at each end portion of said panel structure in communicating relation with the associated ends of said inner fluid containing channel spaces for directing the flow of fluid therethrough, and selectively operable means for admitting a cooling fluid into said intermediate fluid containing spaces at a position adjacent one end portion of said panel structure and for allowing said cooling fluid to flow through said intermediate fluid containing spaces and outwardly thereof at a position adjacent the other end portion of said panel structure whereby overheating of said panel structure can be prevented in the event that the flow of fluid through said inner fluid containing channel spaces is stopped during a period in which said panel structure is receiving radiant energy of an intensity sufficient to effect such overheating.

16. A radiant energy heat exchanger as defined in claim 11 wherein means is provided for directing a flow of fluid through said inner fluid containing channel spaces from a position adjacent one end portion of said panel structure to a position adjacent the other end portion of said panel structure so that during the flow of said fluid radiant energy will be received thereby only after such radiant energy passes inwardly through said sheet form wall sections and said outer fluid containing spaces, said fluid directing means including manifold means extending along one peripheral end portion of said panel structure, said manifold means comprising a body of closed cell foamed plastic extending into the adjacent ends of the inner fluid containing channel spaces sealing the same, and a bore in said panel structure extending transversely therein and in said body of foamed plastic in a position inwardly of the sealed ends of said inner fluid containing channel spaces so that the foamed plastic material sealing said ends defines a side wall portion of said bore and another side wall portion thereof is open to each inner fluid containing channel space.

17. A radiant energy heat exchanger as defined in claim 11 wherein means is provided for directing a flow of fluid through said inner fluid containing channel spaces from a position adjacent one end portion of said panel structure to a position adjacent the other end portion of said panel structure so that during the flow of said fluid radiant energy passes inwardly through said sheet form wall sections and said outer fluid containing spaces, said fluid directing means including manifold means extending along one peripheral end portion of said panel structure, said manifold means comprising means defining an arcuate groove in the associated end portion of said panel structure extending into the adjacent end of said inner fluid containing channel spaces, a tubular member peripherally engaged within said groove and having a peripheral opening communicating with the associated end of each inner fluid containing channel space, and a body of closed cell foamed plastic material sealingly secured exteriorly between said tubular member and said panel structure.

18. A radiant energy heat exchanger as defined in claim 11 wherein first manifold means is provided at each end portion of said panel structure communicating with the associated ends of said inner fluid containing channel spaces for directing a flow of fluid through said inner fluid containing channel spaces from a position adjacent one end portion of said panel structure to a position adjacent the other end portion of said panel structure so that during the flow of said fluid, radiant energy will be received thereby only after such radiant energy passes inwardly through said sheet form wall sections and said outer and intermediate fluid containing spaces, second manifold means at each end portion of said panel structure communicating with the associated ends of said intermediate fluid containing spaces for directing a flow of fluid through said intermediate fluid containing spaces from a position adjacent one end portion of said panel structure to a position adjacent the other end portion of said panel structure so that during the flow of said fluid, radiant energy will pass outwardly therefrom through said outer and intermediate sheet form wall sections and said outer fluid containing spaces, and means for selectively preventing the flow of the fluid through either (1) said intermediate spaces or (2) said inner spaces depending upon the solar radiation conditions present.

19. A radiant energy heat exchanger as defined in claim 11 wherein means is provided for directing a flow of fluid (1) from a position adjacent one end portion of said panel structure through said outer fluid containing spaces to a position adjacent the other end portion of said panel structure and into said intermediate fluid containing spaces (2) from a position adjacent the other end portion of said panel structure through said intermediate fluid containing spaces to a position adjacent the one end portion of said panel structure and into said inner fluid containing channel spaces, and (3) from a position adjacent the one end portion of said panel structure through said inner fluid containing channel spaces to a position adjacent the other end of said panel so that during the flow of said fluid through said inner fluid containing channel spaces energy will be received thereby only after such energy passes through successively (1) the outer wall sections, (2) the fluid flowing in said outer fluid containing spaces (3) the intermediate wall sections (4) the fluid flowing in said intermediate fluid containing spaces and (5) said inner wall sections.

20. A radiant energy heat exchanger as defined in claim 11 wherein each of said outer sheet form wall sections is of concavo-convex cross-sectional configuration with the convex surface thereof facing outwardly so as to (1) provide a multiplicity of side-by-side arches on the operable side of said panel structure which serve to enhance the load bearing capabilities thereof; (2) provide a multiplicity of side-by-side convex surfaces on the operable side of said panel structure which serve to enhance the range of the angle of incidence of radiant energy passable therethrough; and (3) provide a multiplicity of side-by-side lenses on the operable side of said panel structure which serve to concentrate the radiant energy passing therethrough, and wherein a series of transverse lens sections is formed on the inner surface of each outer wall section extending longitudinally between the end portions of said panel structure for concentrating the radiant energy passing therethrough into the associated inner fluid containing channel space.

21. A radiant energy heat exchanger as defined in claim 20 wherein each of said intermediate sheet form wall sections is of concavo-convex cross-sectional configuration with the convex surface thereof facing outwardly so as to provide a multiplicity of side-by-side inner lenses within said panel structure which serve to concentrate the radiant energy passing therethrough into said inner fluid containing channel spaces.

22. A radiant energy heat exchanger as defined in claim 21 wherein a series of transverse lens sections is formed on a surface of each intermediate wall section extending longitudinally between the end portions of said panel structure for concentrating the radiant energy passing therethrough into the associated inner fluid containing channel spaces.

23. A radiant energy heat exchanger as defined in claim 22 wherein each of said inner wall sections is of concavo-convex cross-sectional configuration with the convex surface thereof facing outwardly.

24. A radiant energy heat exchanger as defined in claim 23 wherein each of said inner fluid containing channel spaces is of generally V-shaped cross-sectional configuration.

25. A radiant energy heat exchanger as defined in claim 23 wherein each of said inner fluid containing channel spaces is of generally U-shaped cross-sectional configuration.

26. A radiant energy heat exchanger as defined in claim 11 wherein said outer and intermediate wall sections are of concavo-convex cross-sectional configuration, each associated pair of outer and intermediate wall sections being joined along the lateral edges thereof related to one another so as to define an outer fluid containing space having the cross-sectional configuration of a positive lens with two convex surfaces.

27. A radiant energy heat exchanger as defined in claim 11 wherein said base includes a first layer of metal foil disposed generally in contact with the inner exterior surfaces of said barrier walls, the surface of said metal foil contacting said barrier walls being coated with a material which is opaque to radiation, a second layer of metal foil having portions spaced from said first layer, and an insulating filler material in the space between said first and second layers of metal foil.

28. A radiant energy heat exchanger as defined in claim 27 wherein said base further includes a layer of foamed insulative material contacting said second layer of metal foil.

29. A radiant energy heat exchanger as defined in claim 28 wherein said base further includes a layer of transparent dielectric material contacting said layer of foamed insulative material.

30. A radiant energy heat exchanger as defined in claim 27 wherein said first layer of metal foil is crimped.

31. A radiant energy heat exchanger as defined in claim 11 wherein each of said outer wall sections is of concavo-convex cross-sectional configuration with the convex surface thereof facing outwardly, the wall thickness of each outer wall section being greater in the center than the ends thereof so as to define the cross-sectional shape of a positive meniscus lens.

32. A radiant energy heat exchanger as defined in claim 11 wherein said barrier walls include lower wall sections each defining the inner portion of an inner channel space and having an arcuate cross-sectional configuration, each of said inner wall sections being of arcuate cross-sectional configuration and forming with an associated lower wall section a generally cylindrical wall cross-sectional configuration.

33. A radiant energy heat exchanger as defined in claim 32 wherein said barrier walls include upper wall sections converging upwardly from the adjacent ends of adjacent lower wall sections.

34. A radiant energy heat exchanger as defined in claim 32 wherein said lower wall sections have a coating on the interior surfaces thereof which is of a material opaque to radiation.

35. A radiant energy heat exchanger as defined in claim 33 wherein the inner wall sections of arcuate cross-sectional configuration have an arcuate extent less than 180°, adjacent lower wall sections being integrally interconnected at diametrically opposed positions, the portions of adjacent lower wall sections disposed above the integral juncture defining with the associated upper wall sections a separate interior space in said panel construction.

36. A radiant energy heat exchanger as defined in claim 35 wherein said lower wall sections have a coating on the interior surfaces thereof which is of a material opaque to radiation.

37. A radiant energy heat exchanger as defined in claim 35 wherein said inner spaces have metallic material therein providing for the flow of a gaseous fluid medium in contact therewith, said metallic material having high gas contacting surface areas in relation to the volume thereof within said inner space.

38. A radiant energy heat exchanger as defined in claim 37 wherein said metallic material is in the form of a multiplicity of short fibers fixed to the interior surfaces provided by said cylindrical wall cross-sectional configuration.

39. A radiant energy heat exchanger as defined in claim 11 wherein said inner spaces have metallic material therein providing for the flow of a gaseous fluid medium in contact therewith, said metallic material having high gas contacting surface areas in relation to the volume thereof within said inner space.

40. A radiant energy heat exchanger as defined in claim 39 wherein said metallic material is in the form of a multiplicity of short fibers fixed to the interior surfaces provided by said cylindrical wall cross-sectional configuration.

41. A radiant energy heat exchanger as defined in claim 39 wherein said metallic material is in the form of a helical strip.

42. A radiant energy heat exchanger as defined in claim 41 wherein said helical strip is made of aluminum foil.

43. A radiant energy heat exchanger as defined in claim 11 wherein said inner wall sections constitute the upper portions of a multiplicity of separate tubular elements, the remainder of said tubular elements constituting a portion of said barrier walls.

44. A radiant energy heat exchanger as defined in claim 43 wherein said separate tubular elements are formed of a material having a higher melting point than the material from which the remaining portions of the barrier walls and said intermediate and outer wall sections are formed.

45. A radiant energy heat exchanger as defined in claim 11 wherein each of said outer wall sections in cross-section is in the shape of a plano-convex positive lens.

46. A radiant energy heat exchanger comprising:
a panel structure having sides of substantial area bounded by a thin periphery including opposed peripheral end portions, one of said sides being operable to face in a direction to receive radiant energy with the other side facing in opposed relation to said operable side, said panel structure including
a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure,
an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure, an outer sheet form wall section sealingly connected with each pair of adjacent barrier walls at positions along the outer portions thereof and extending transversely across the associated pair of adjacent barrier walls outwardly of the associated inner wall and section longitudinally between the end portions of said panel structure, the exterior surfaces of said outer wall sections defining coextensive areas of the operable side of said panel structure, said sheet form wall sections being constructed to facilitate the passage of radiant energy inwardly therethrough so that a flow of fluid through said inner fluid containing channel spaces from a position adjacent one end portion of said panel structure will result in radiant energy being received by the fluid flow only after such radiant energy passes inwardly through said sheet form wall sections and said outer fluid containing spaces, said base being constructed to retard the passage of radiant energy therethrough, each of said outer sheet form wall sections being of concavo-convex cross-sectional configuration with the convex surface thereof facing outwardly so as to (1) provide a multiplicity of side-by-side arches on the operable side of said panel structure which serve to enhance the load bearing capabilities thereof; (2) provide a multiplicity of side-by-side convex surfaces on the operable side of said panel structure which serve to enhance the range of the angle of incidence of radiant energy possible therethrough; and (3) provide a multiplicity of side-by-side lenses on the operable side of said panel structure which serve to concentrate the radiant energy passing therethrough, and a series of transverse lens sections formed on the inner surface of each outer wall section extending longitudinally between the end portions of said panel structure for concentrating the radiant energy passing therethrough into the associated inner fluid containing channel space.

47. A radiant energy heat exchanger comprising:

a panel structure having sides of substantial area bounded by a thin periphery including opposed peripheral end portions, one of said sides being operable to face in a direction to receive radiant energy with the other side facing in opposed relation to said operable side, said panel structure including a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure, an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure, an outer sheet form wall section sealingly connected with each pair of adjacent barrier walls at positions along the outer portions thereof and extending transversely across the associated pair of adjacent barrier walls outwardly of the associated inner wall and section longitudinally between the end portions of said panel structure, the exterior surfaces of said outer wall sections defining coextensive areas of the operable side of said panel structure, each of said outer sheet form wall sections being of concavo-convex cross-sectional configuration with the convex surface thereof facing outwardly so as to (1) provide a multiplicity of side-by-side arches on the operable side of said panel structure which serve to enhance the load bearing capabilities thereof; (2) provide a multiplicity of side-by-side convex surfaces on the operable side of said panel structure which serve to enhance the range of the angle of incidence of radiant energy passable therethrough; and (3) provide a multiplicity of side-by-side lenses on the operable side of said panel structure which serve to concentrate the radiant energy passing therethrough;

an intermediate sheet form wall section sealingly connected with each pair of adjacent barrier walls at positions along the outer portions thereof and extending across the associated pair of adjacent barrier walls between the associated inner and outer wall sections and longitudinally between the end portions of said panel structure so as to define a multiplicity of outer and intermediate fluid containing spaces in outwardly disposed relation with respect to said multiplicity of inner fluid containing channel spaces, each of said intermediate sheet form wall sections being of concavo-convex cross-sectional configuration with the convex surface thereof facing outwardly so as to provide a multiplicity of side-by-side inner lenses within said panel structure which serve to concentrate the radiant energy passing therethrough into said inner fluid containing channel spaces, said sheet form wall sections being constructed to facilitate the passage of radiant energy inwardly therethrough so that a flow of fluid through said inner fluid containing channel spaces from a position adjacent one end portion of said panel structure to a position adjacent the other end portion of said panel structure will result in radiant energy being received by the fluid flow only after such radiant energy passes inwardly through said sheet form wall sections and said outer and intermediate fluid containing spaces, said base being constructed to retard the passage of radiant energy therethrough.

48. A radiant energy heat exchanger comprising:

a panel structure having sides of substantial area bounded by a thin periphery including opposed peripheral end portions, one of said sides being operable to face in a direction to receive radiant energy with the other side facing in opposed relation to said operable side, said panel structure including a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure, an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure, an outer sheet form wall section sealingly connected with each pair of adjacent barrier walls at positions along the outer portions thereof and extending transversely across the associated pair of adjacent barrier walls outwardly of the associated inner wall section and longitudinally between the end portions of said panel structure, the exterior surfaces of said outer wall sections defining coextensive areas of the operable side of said panel structure, means including said outer and inner wall sections defining a multiplicity of outer fluid containing spaces extending longitudinally between the end portions of said panel structure in outwardly disposed relation with respect to said multiplicity of inner fluid containing channel spaces, said sheet form wall sections being constructed to facilitate the passage of radiant energy inwardly therethrough, said base being constructed to retard the passage of radiant energy therethrough, and means for directing a flow of fluid through said inner fluid containing channel spaces from a position adjacent one end portion of said panel structure to a position adjacent the other end portion of said panel structure so that during the flow of said fluid radiant energy will be received thereby only after such radiant energy passes inwardly through said sheet form wall sections and said outer fluid containing spaces, said fluid directing means including manifold means extending along one peripheral end portion of said panel structure, said manifold means comprising a body of closed cell foamed plastic extending into the adjacent ends of the inner fluid containing channel spaces sealing the same, and a bore in said panel structure extending transversely therein and in said body of foamed plastic in a position inwardly of the sealed ends of said inner fluid containing channel spaces so that the foamed plastic material sealing said ends defines a side wall portion of said bore and another side wall portion thereof is open to each inner fluid containing channel space.

49. A radiant energy heat exchanger comprising:

a panel structure having sides of substantial area bounded by a thin periphery including opposed peripheral end portions, one of said sides being operable to face in a direction to receive radiant energy with the other side facing in opposed relation to said operable side, said panel structure including a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure, an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure, an outer sheet form wall section sealingly connected with each pair of adjacent barrier walls at positions along the outer portions thereof and extending tranversely across the associated pair of adjacent barrier walls outwardly of the associated inner wall section and longitudinally between the end portions of said panel structure, the exterior surfaces of said outer wall sections defining coextensive areas of the operable side of said panel structure, means including said outer and inner wall sections defining a multiplicity of outer fluid containing spaces extending longitudinally between the end portions of said panel structure in outwardly disposed relation with respect to said multiplicity of inner fluid containing channel spaces, said sheet form wall sections being constructed to facilitate the passage of radiant energy inwardly therethrough, said base being constructed to retard the passage of radiant energy therethrough, and means for directing a flow of fluid through said inner fluid containing channel spaces from a position adjacent one end portion of said panel structure to a position adjacent the other end portion of said panel structure so that during the flow of said fluid radiant energy will be received thereby only after such radiant energy passes inwardly through said sheet form wall sections and said outer fluid containing spaces, said fluid directing means including manifold means extending along one peripheral end portion of said panel structure, said manifold means comprising means defining an arcuate groove in the associated end portion of said panel structure extending into the adjacent end of said inner fluid containing channel spaces, a tubular member peripherally engaged within said groove and having a peripheral opening communicating with the associated end of each inner fluid containing channel space, and a body of closed cell foamed plastic material sealingly secured exteriorly between said tubular member and said panel structure.

50. A combined roof and radiant energy heat exchanger assembly comprising a roof section presenting an upwardly facing surface area inclined downwardly in at least one redetermined direction, a plurality of elongated thin walled strips having downwardly facing roof engaging surfaces, said strips being secured to said roof section surface area in parallel relation with respect to said predetermined direction with the downwardly facing surfaces thereof engaging the roof section surface area, means on each of said strips defining a continuous upwardly open shallow channel including laterally spaced side walls extending in said predetermined direction, a radiant energy heat exchanger panel structure disposed between each adjacent pair of elongated strips, each panel structure having sides of substantial area bounded by a thin periphery including opposed peripheral end portions and opposed peripheral side portions, each panel structure being mounted on said roof section between its associated pair of elongated strips so that one operable side thereof faces upwardly and the other side engages the associated portion of said roof section surface area in generally planar relation with respect to the downwardly facing surfaces of said strips with each peripheral side portion thereof providing a continuous barrier for the adjacent side wall of the shallow channel provided by the adjacent strip, fastening means fixedly secured to each strip and disposed in overlying relation to the adjacent peripheral side portion of the operable side of each panel structure adjacent to said strip so that each panel structure is held in engagement with said roof section thereby, means in each panel structure defining fluid containing spaces disposed in radiant energy exchanging relation with respect to the operative side of said panel structure and means extending along peripheral end portions of said panel structures for directing a flow of fluid into, through and out of the fluid containing spaces of said panel structures.

51. An assembly as defined in claim 50 wherein said fluid directing means includes manifold means extending along one peripheral end portion of each of said panel structures, each of said manifold means comprising means defining an arcuate groove in the associated end portion of said panel structure extending into the adjacent end of said fluid containing spaces, a tubular member peripherally engaged within said groove and having a peripheral opening communicating with the associated end of each fluid containing space, and a body of closed cell foamed plastic material sealingly secured exteriorly between said tubular member and said panel structure, the tubular member associated with each panel structure extending laterally outwardly from each peripheral side portion thereof, the adjacent outwardly extending end portions of the tubular member of adjacent panel structures having means connecting the same in communicating relation.

52. An assembly as defined in claim 51 wherein each of said connecting means comprises a bellows tube fitted over each adjacent tubular member end portion and a peripheral clamp fixedly securing the fitted over portion of each bellows tube to the associated end portion.

53. An assembly as defined in claim 50 wherein each of said strips includes a central wall extending upwardly in parallel relation between said laterally spaced side walls, said central wall having downwardly and outwardly extending barb portions thereon, said fastening means being fixedly secured to the associated strip by said barb portions.

54. An assembly as defined in claim 53 wherein said fastening means comprises a fastening strip for each channel defining strip, each fastening strip having a pair of spaced wall sections depending from the central portion thereof, said pair of spaced wall sections having inwardly and upwardly directed barb portions for cooperatively engaging the downwardly and outwardly directed barb portions of the cooperating channel defining strip.

55. An assembly as defined in claim 54 wherein each of said strips is extruded of thermoplastic material.

56. An assembly as defined in claim 55 wherein said thermoplastic material is polyvinyl chloride.

57. An assembly as defined in claim 50 wherein each of said panel structures includes a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure, an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide said fluid containing spaces as a plurality of inner fluid containing channel spaces extending longitudinally between the end portions of said panel structure, an outer sheet form wall section sealingly connected with each pair of adjacent barrier walls at positions along the outer portions thereof and extending transversely across the associated pair of adjacent barrier walls outwardly of the associated inner wall and section longitudinally between the end portions of said panel structure, the exterior surfaces of said outer wall sections defining coextensive areas of the operable side of said panel structure, an intermediate sheet form wall section sealingly connected with each pair of adjacent barrier walls at positions along the outer portions thereof and extending across the associated pair of adjacent barrier walls between the associated inner and outer wall sections and longitudinally between the end portions of said panel structure so as to define a multiplicity of outer and intermediate fluid containing spaces in outwardly disposed relation with respect to said multiplicity of inner fluid containing channel spaces.

58. A radiant energy heat exchanger as defined in claim 57 wherein each of said outer sheet form wall sections is of concavo-convex cross-sectional configuration with the convex surface thereof facing outwardly so as to (1) provide a multiplicity of side-by-side arches on the operable side of each panel structure which serve to enhance the load bearing capabilities thereof; (2) provide a multiplicity of side-by-side convex surfaces on the operable side of each panel structure which serve to enhance the range of the angle of incidence of radiant energy passable therethrough; and (3) provide a multiplicity of side-by-side lenses on the operable side of each panel structure which serve to concentrate the radiant energy passing therethrough.

59. An assembly as defined in claim 57 wherein said base of each panel structure includes a plurality of bundles of glass filaments within said barrier walls encased within folds of a thin sheet of flexible thermoplastic material defining the other side of each panel structure.

60. An assembly as defined in claim 57 wherein said flow directing means comprises first manifold means at each end portion of each panel structure communicating with the associated ends of the inner fluid containing channel spaces thereof for directing a flow of fluid through said inner fluid containing channel spaces from a position adjacent one end portion of said panel structure to a position adjacent the other end portion of said panel structure so that during the flow of said fluid, radiant energy will be received thereby only after such radiant energy passes inwardly through said sheet form wall sections and said outer and intermediate fluid containing spaces, second manifold means at each end portion of each panel structure communicating with the associated ends of said intermediate fluid containing spaces thereof for directing a flow of fluid through said intermediate fluid containing spaces from a position adjacent one end portion of said panel structure to a position adjacent the other end portion of said panel structure so that during the flow of said fluid, radiant energy will pass outwardly therefrom through said outer and intermediate sheet form wall sections and said outer fluid containing spaces, and means for selectively preventing the flow of the fluid through either (1) said intermediate spaces or (2) said inner spaces depending upon the solar radiation conditions present.

61. An assembly as defined in claim 57 wherein said fluid directing means includes means for directing a flow of fluid (1) from a position adjacent one end portion of each panel structure through said outer fluid containing spaces thereof to a position adjacent the other end portion of said panel structure and into said intermediate fluid containing spaces thereof, (2) from a position adjacent the other end portion of each panel structure through said intermediate fluid containing spaces thereof to a position adjacent the one end portion of said panel structure and into said inner fluid containing channel spaces thereof, and (3) from a position adjacent the one end portion of each panel structure through said inner fluid containing channel spaces thereof to a position adjacent the other end of said panel so that during the flow of said fluid through said inner fluid containing channel spaces energy will be received thereby only after such energy passes through successively (1) the outer wall sections, (2) the fluid flowing in said outer fluid containing spaces, (3) the intermediate wall sections, (4) the fluid flowing in said intermediate fluid containing spaces, and (5) said inner wall sections.

62. An assembly as defined in claim 58 wherein a series of transverse lens sections is formed on the inner surface of each outer wall section extending longitudinally between the end portions of each panel structure for concentrating the radiant energy passing therethrough into the associated inner fluid containing channel space.

63. An assembly as defined in claim 62 wherein each of said intermediate sheet form wall sections is of concavo-convex cross-sectional configuration with the convex surface thereof facing outwardly so as to provide a multiplicity of side-by-side inner lenses within each panel structure which serve to concentrate the radiant energy passing therethrough into said inner fluid containing channel spaces.

64. A radiant energy heat exchanger comprising:
a panel structure having sides of substantial area bounded by a thin periphery including opposed peripheral end portions, one of said sides being operable to face in a direction to receive radiant energy with the other side facing in opposed relation to said operable side, said panel structure including
a base defining the other side of said panel structure and having a multiplicity of transversely spaced barrier walls extending longitudinally between the end portions of said panel structure, each of said barrier walls including outer portions disposed outwardly in a direction toward the operable side of said panel structure and extending longitudinally between the end portions thereof, adjacent pairs of barrier walls defining in said base a multiplicity of side-by-side channels extending longitudinally between the end portions of said panel structure,
an inner sheet form wall section sealingly connected with each pair of adjacent barrier walls at positions along the outer portions thereof and extending transversely across the associated pair of adjacent barrier walls and longitudinally between the end portions of said panel structure so as to enclose the associated channel and thereby provide a plurality of inner fluid containing channel spaces extending longitudinally between the end portions of said panel structure,
said barrier walls including lower wall sections each defining the inner portion of an inner channel space and having an arcuate cross-sectional configuration, each of said inner wall sections being of arcuate cross-section configuration and forming with an associated lower wall section a generally cylindrical wall cross-sectional configuration,
an outer sheet form wall section sealingly connected with each pair of adjacent barriers walls at positions along the outer portions thereof and extending transversely across the associated pair of adjacent barrier walls outwardly of the associated inner wall section and longitudinally between the end portions of said panel structure, the exterior surfaces of said outer wall sections defining coextensive areas of the operable side of said panel structure, means including said outer and inner wall sections defining a multiplicity of outer fluid containing spaces extending longitudinally between the end portions of said panel structure in outwardly disposed relation with respect to said multiplicity of inner fluid containing channel spaces, said sheet form wall sections being constructed to facilitate the passage of radiant energy inwardly therethrough so that a flow of fluid directed through said inner fluid containing channel spaces from a position adjacent one end portion of said panel structure to a position adjacent the other end portion of said panel structure will result in radiant energy being received by the fluid flow only after such radiant energy passes inwardly through said sheet form wall sections and said outer fluid containing spaces, said base constructed to retard the passage of radiant energy therethrough.

65. A radiant energy heat exchanger as defined in claim 64 wherein said barrier walls include upper wall sections converging upwardly from the adjacent ends of adjacent lower wall sections.

66. A radiant energy heat exchanger as defined in claim 65 wherein the inner wall sections of arcuate cross-sectional configuration have an arcuate extent less than 180°.

* * * * *